(12) United States Patent
Freda et al.

(10) Patent No.: US 9,839,045 B2
(45) Date of Patent: Dec. 5, 2017

(54) SILENT PERIOD METHOD AND APPARATUS FOR DYNAMIC SPECTRUM MANAGEMENT

(75) Inventors: Martino M. Freda, Laval (CA); Liangping Ma, San Diego, CA (US); Saad Ahmad, Montreal (CA); Jean-Louis Gauvreau, La Prairie (CA); Alpaslan Demir, East Meadow, NY (US); Chunxuan Ye, Wayne, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/287,381

(22) Filed: Nov. 2, 2011

(65) Prior Publication Data

US 2012/0113918 A1    May 10, 2012

Related U.S. Application Data

(60) Provisional application No. 61/410,528, filed on Nov. 5, 2010.

(51) Int. Cl.
*H04W 72/12* (2009.01)
*H04W 56/00* (2009.01)
(Continued)

(52) U.S. Cl.
CPC ....... *H04W 72/1205* (2013.01); *H04W 16/14* (2013.01); *H04W 56/002* (2013.01); *H04W 72/0453* (2013.01)

(58) Field of Classification Search
CPC ..... H04W 16/14; H04W 88/06; H04W 52/46; H04W 8/005; H04L 1/0025; H04L 1/0002;
(Continued)

(56) References Cited

U.S. PATENT DOCUMENTS 6,848,016 B2 *  1/2005  Chue et al. ............... 710/313
7,024,188 B2 *  4/2006  Khun-Jush et al. ......... 455/423
(Continued)

FOREIGN PATENT DOCUMENTS

| CN | 1568601 A | 1/2005 |
| CN | 101179778 A | 5/2008 |

(Continued)

OTHER PUBLICATIONS

R1-082575, Proposals for LTE-Advanced Technologies, Jul. 2008.*
(Continued)

*Primary Examiner* — Charles C Jiang
*Assistant Examiner* — Oussama Roudani
(74) *Attorney, Agent, or Firm* — Condo Roccia Koptiw LLP

(57) ABSTRACT

Described herein is a silent period method and apparatus for dynamic spectrum management. The methods include configuration and coordination of silent periods across an aggregated channel in a wireless communication system. A silent period management entity (SPME) dynamically determines silent period schedules for channels based on system and device information and assigns a silent period duration and periodicity for each silent period. The SPME may reconfigure the silent period schedule based on system delay, system throughput, channel quality or channel management events. A silent period interpretation entity (SPIE) receives and implements the silent period schedule. The silent periods for the channels may be synchronized, independent, or set-synchronized. Interfaces for communicating between the SPME, SPIE, a channel management function, a medium access control (MAC) quality of service (QoS) entity, a sensing/capabilities database, a MAC layer management entity (MLME) and a wireless receive/transmit unit (WTRU) MLME are described herein.

20 Claims, 26 Drawing Sheets

(51) Int. Cl.
*H04W 16/14* (2009.01)
*H04W 72/04* (2009.01)

(58) Field of Classification Search
CPC ... H04L 1/0032; H04L 1/1671; H04L 1/1685; H04L 29/12009; H04L 61/00; H04M 7/006
USPC ............. 370/329, 458, 352, 252, 328, 338
See application file for complete search history.

(56) References Cited

U.S. PATENT DOCUMENTS

| | | | |
|---|---|---|---|
| 8,155,141 B2 * | 4/2012 | Cordeiro et al. | 370/458 |
| 2005/0054294 A1 | 3/2005 | Khun-Jush et al. | |
| 2009/0016293 A1 * | 1/2009 | Kang et al. | 370/329 |
| 2009/0258603 A1 * | 10/2009 | Ghaboosi | H04W 74/002 455/68 |
| 2010/0061315 A1 | 3/2010 | Cordeiro | |
| 2010/0203914 A1 | 8/2010 | Shan et al. | |
| 2010/0303024 A1 * | 12/2010 | Gossain | H04W 72/04 370/329 |
| 2012/0039183 A1 * | 2/2012 | Barbieri et al. | 370/241.1 |
| 2012/0071189 A1 * | 3/2012 | Mody | 455/513 |
| 2012/0163309 A1 | 6/2012 | Ma et al. | |
| 2012/0320741 A1 | 12/2012 | Freda et al. | |
| 2014/0177576 A1 | 6/2014 | Lindoff et al. | |

FOREIGN PATENT DOCUMENTS

| | | |
|---|---|---|
| CN | 101179821 A | 5/2008 |
| CN | 101390424 A | 3/2009 |
| JP | 2009-527972 A | 7/2009 |
| JP | 2009-232188 A | 10/2009 |
| JP | 2011-517536 A | 6/2011 |
| JP | 2012-523207 A | 9/2012 |
| TW | 2008-43378 A | 11/2008 |
| WO | 03/026218 | 3/2003 |
| WO | 2007/094604 | 8/2007 |
| WO | 2007/096819 | 8/2007 |
| WO | WO 2008/090509 A2 | 7/2008 |
| WO | 2009/072088 | 6/2009 |
| WO | WO 2009/120125 A1 | 10/2009 |
| WO | WO 2010/097722 A1 | 9/2010 |
| WO | WO 2010/117998 A2 | 10/2010 |
| WO | 2012/064502 | 10/2012 |

OTHER PUBLICATIONS

IEEE Standard for Information technology—Telecommunications and information exchange between systerms—Local and metropolitan area networks—Specific requirements, Part 11: Wireless LAN Medium Access Control (MAC) and Physical Layer (PHY) Specifications; Amendment 5: Enhancements for Higher Throughput, IEEE Std. 802.11n-2009 (Sep. 11, 2009).

IEEE Standard for Information technology—Telecommunications and information exchange between systerms—Local and metropolitan area networks—Specific requirements; Part 11: Wireless LAN Medium Access Control (MAC) and Physical Layer (PHY) Specifications; Amendment 4:Further Higher Data Rate Extension in the 2.4 GHz Band, IEEE Std. 802.11g-2003 (Jun. 27, 2003).

Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band, IEEE Std 802.11b-1999 (R2003) (Jun. 12, 2003).

IEEE Standard for Information technology—Telecommunications and information exchange between systerms—Local and metropolitan area networks—Specific requirements; Part 11: Wireless LAN Medium Access Control (MAC) and Physical Layer (PHY) Specifications; Amendment 5: Enhancements for Higher Throughput, IEEE Std. 802.11n-2009 (Sep. 11, 2009).

3rd Generation Partnership Project (3GPP), R2-095812, "DRX Consideration in LTE-Advanced", Huawei, 3GPP TSG-RAN WG2 Meeting #67bis, Miyazaki, Japan, Oct. 12-16, 2009, 2 pages.

* cited by examiner

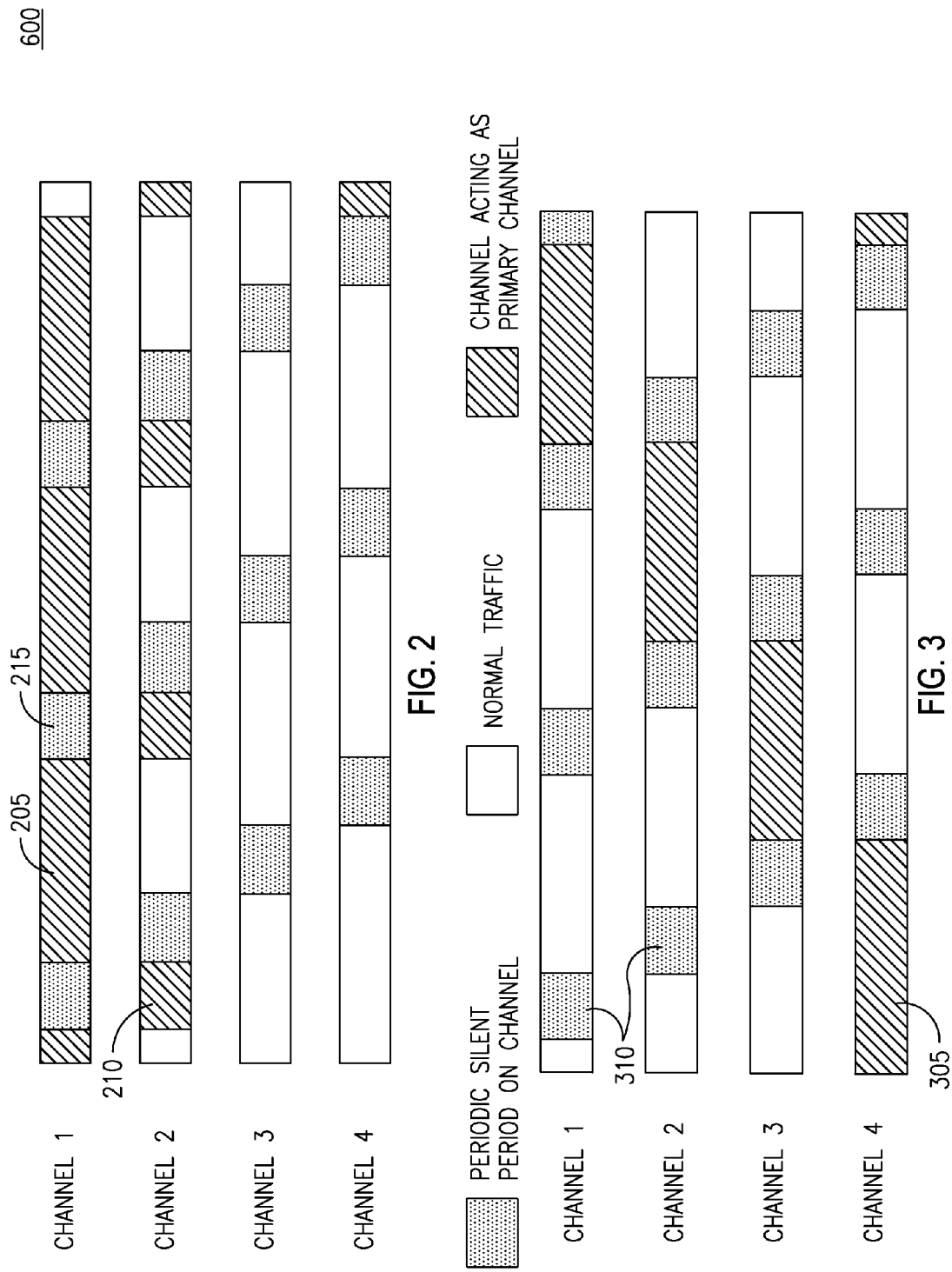

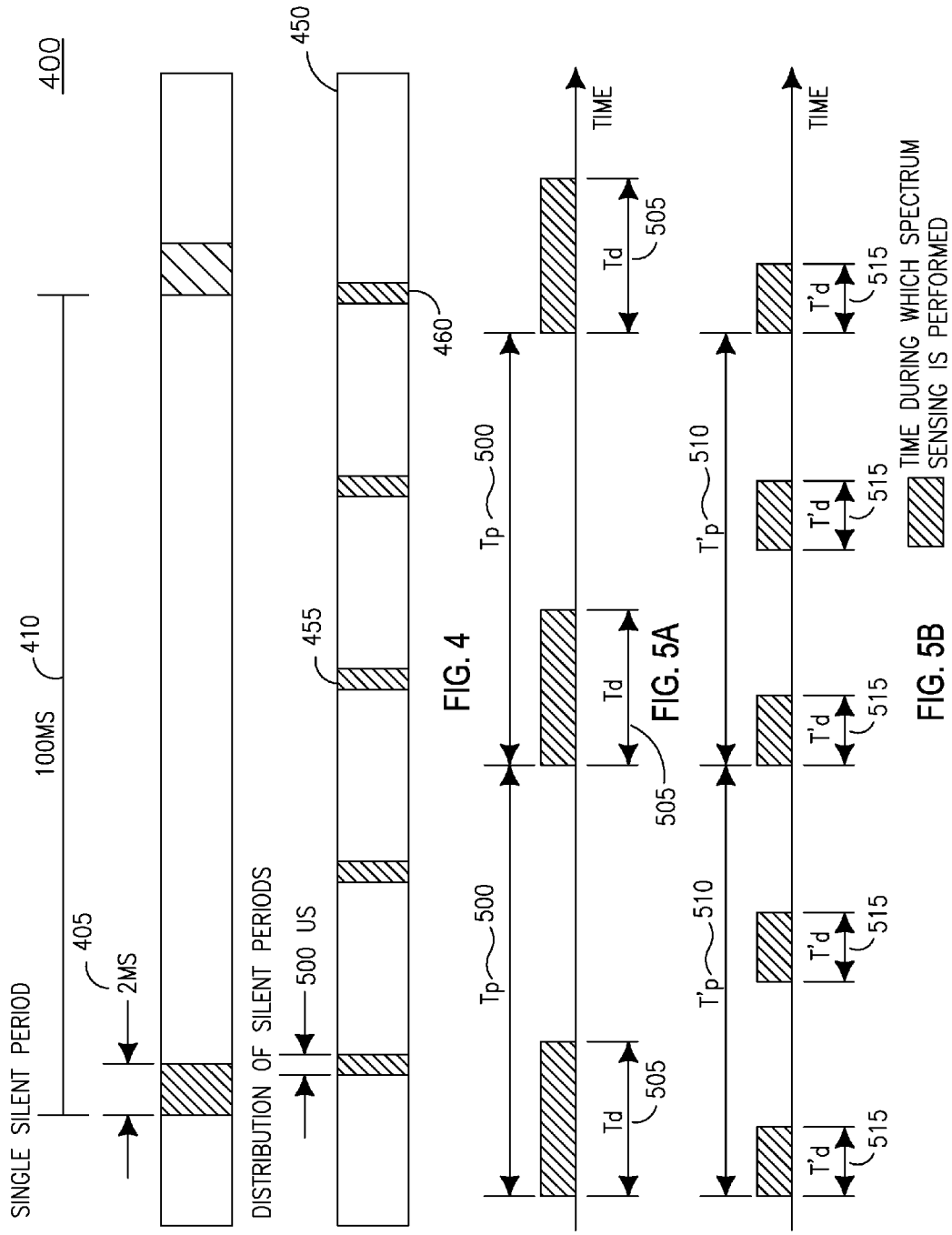

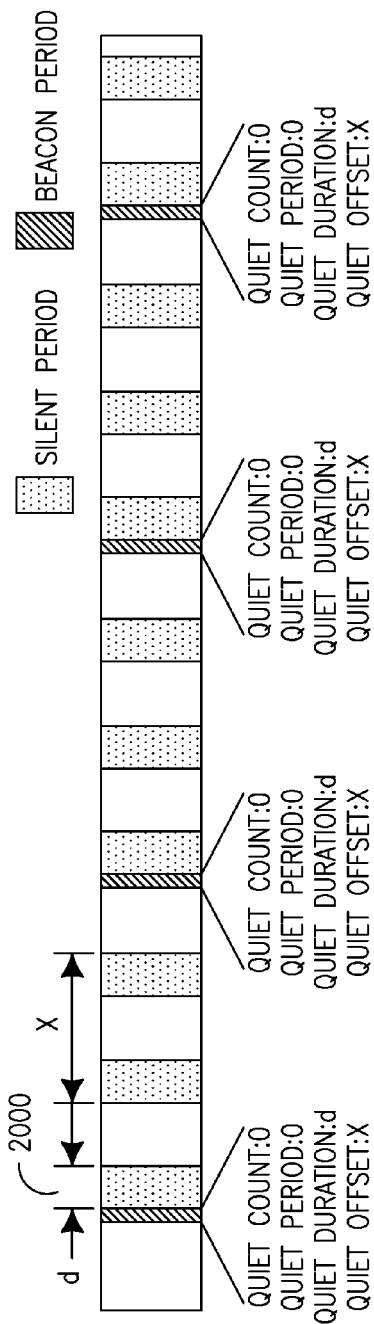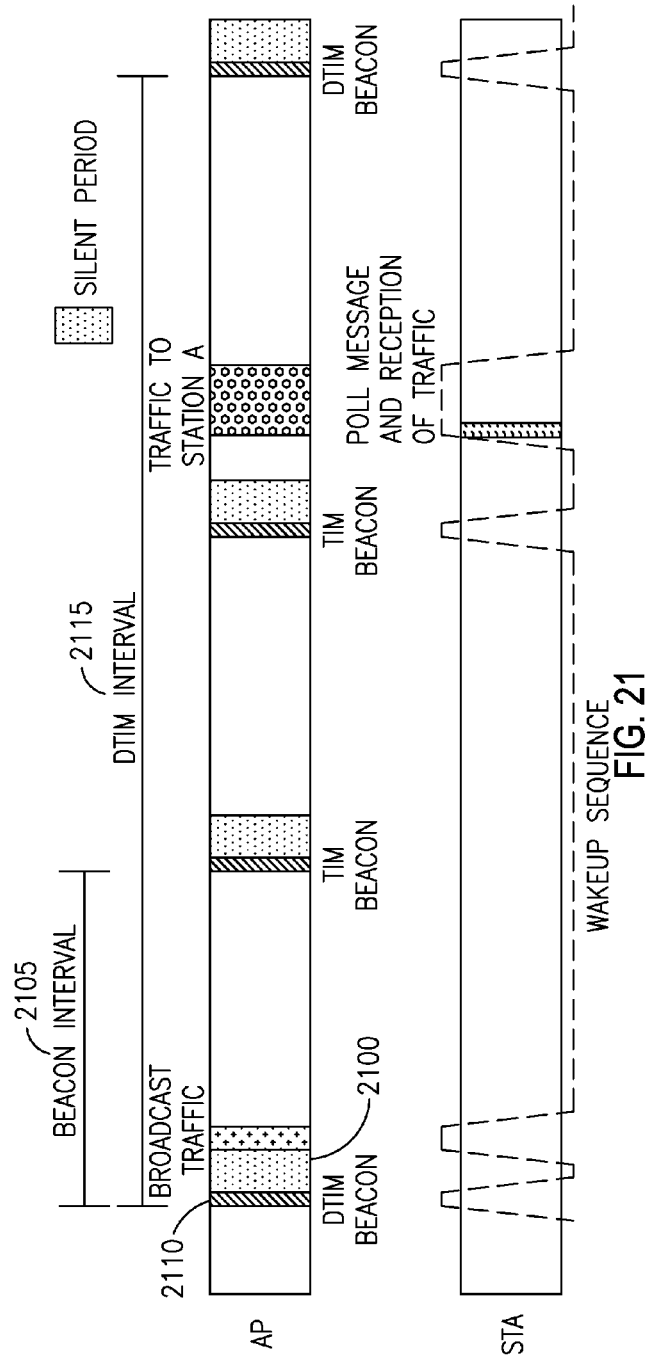

SILENT PERIOD METHOD AND APPARATUS FOR DYNAMIC SPECTRUM MANAGEMENT

CROSS REFERENCE TO RELATED APPLICATIONS

This application claims the benefit of U.S. provisional application No. 61/410,528, filed Nov. 5, 2010, the contents of which are hereby incorporated by reference herein.

FIELD OF INVENTION

This application is related to wireless communications.

BACKGROUND

Local Wireless Network systems such as Institute of Electrical and Electronics Engineers (IEEE) 802.11 may operate in a predefined spectrum, such as, for example, a contiguous spectrum channel. In addition, the spectrum allowed for cellular licensed devices and devices operating in unlicensed bands such as industrial, scientific and medical (ISM), may not change over time.

In the United States, 408 MHz of spectrum from 54 MHz to 806 MHz may be allocated for television (TV). A portion of that spectrum may be redeveloped for commercial operations through auctions and for public safety applications. The remaining portion of the spectrum may remain dedicated for over-the-air TV operations. However, throughout the United States, portions of that spectrum resource may remain unused. The amount and exact frequency of unused spectrum may vary from location to location. These unused portions of spectrum may be referred to as TV White Space (TVWS). Because there are fewer TV stations located outside top metropolitan areas, most of the unoccupied TVWS spectrum is available in low population density or rural areas that tend to be underserved with other broadband options such as Digital Subscriber Line (DSL) or cable.

Each available TV channel may provide 6 MHz of spectrum capacity that may be used for broadband connectivity. TVWS may have large coverage areas due to long range propagation of signals at these frequencies. For example, a wireless local area network (WLAN) access point (AP) location operating in TVWS may provide coverage for an area of a few square miles. In contrast, wireless equipment such as IEEE 802.11b/g/n may have an average coverage area of 150 square feet.

Aggregating multiple channels and using a primary channel was introduced in IEEE 802.11n and 802.11ac. 802.11n and 802.11ac to deal with continuous channels. When operating in TVWS, multiple continuous channels may not be available, and aggregation on non-continuous channels may be required. The concept of silent measurement periods was introduced in IEEE 802.11 for detection of radar in the 5 GHz bands. A silent period may be used in physical layer/medium access control layer (PHY/MAC) devices operating in TVWS. In both cases, these were based on sensing silent period information on the beacon. However, they do not address sensing silent period information over aggregated channels.

The sse of silent periods may lead to a loss of throughput and an increase of delay/jitter. When a set of stations are silenced for measurements, the outgoing traffic may be buffered during the silent period, resulting in an increase of buffer space requirements. In addition, the loss of throughput and introduction of delay/jitter could adversely affect certain applications which are being run on the network.

SUMMARY

Described herein is a silent period method and apparatus for dynamic spectrum management. The methods include configuration and coordination of silent periods across an aggregated channel in a wireless communication system. A silent period management entity (SPME) dynamically determines silent period schedules for channels based on system and device information and assigns a silent period duration and periodicity corresponding for each silent period. The SPME may reconfigure the silent period schedule based on at least one of system delay, system throughput, channel quality or channel management events. A silent period interpretation entity (SPIE) receives and implements the silent period schedule. The silent periods for the channels may be synchronized, independent, or set-synchronized. Interfaces for communicating between the SPME, SPIE, a channel management function, a medium access control (MAC) quality of service (QoS) entity, a sensing/capabilities database, a MAC layer management entity (MLME) and a wireless receive/transmit unit (WTRU) MLME are described herein.

BRIEF DESCRIPTION OF THE DRAWINGS

FIG. 2 is a diagram of an example four-channel silent period schedule;

FIG. 3 is a diagram of another example four-channel silent period schedule;

FIG. 4 is a diagram of example silent period configurations;

FIGS. 5A and 5B are diagrams of two example silent period configurations;

FIGS. 20A, 20B and 20C are examples of silent period intervals relative to beacon intervals;

FIG. 21 is a diagram of an example placement of silent periods with traffic indication map (TIM) and delivery traffic indication message (DTIM) times;

DETAILED DESCRIPTION OF THE EMBODIMENTS

Described herein are example communication systems that may be applicable and may be used with the description herein below. Other communication systems may also be used.

Figure 1A:
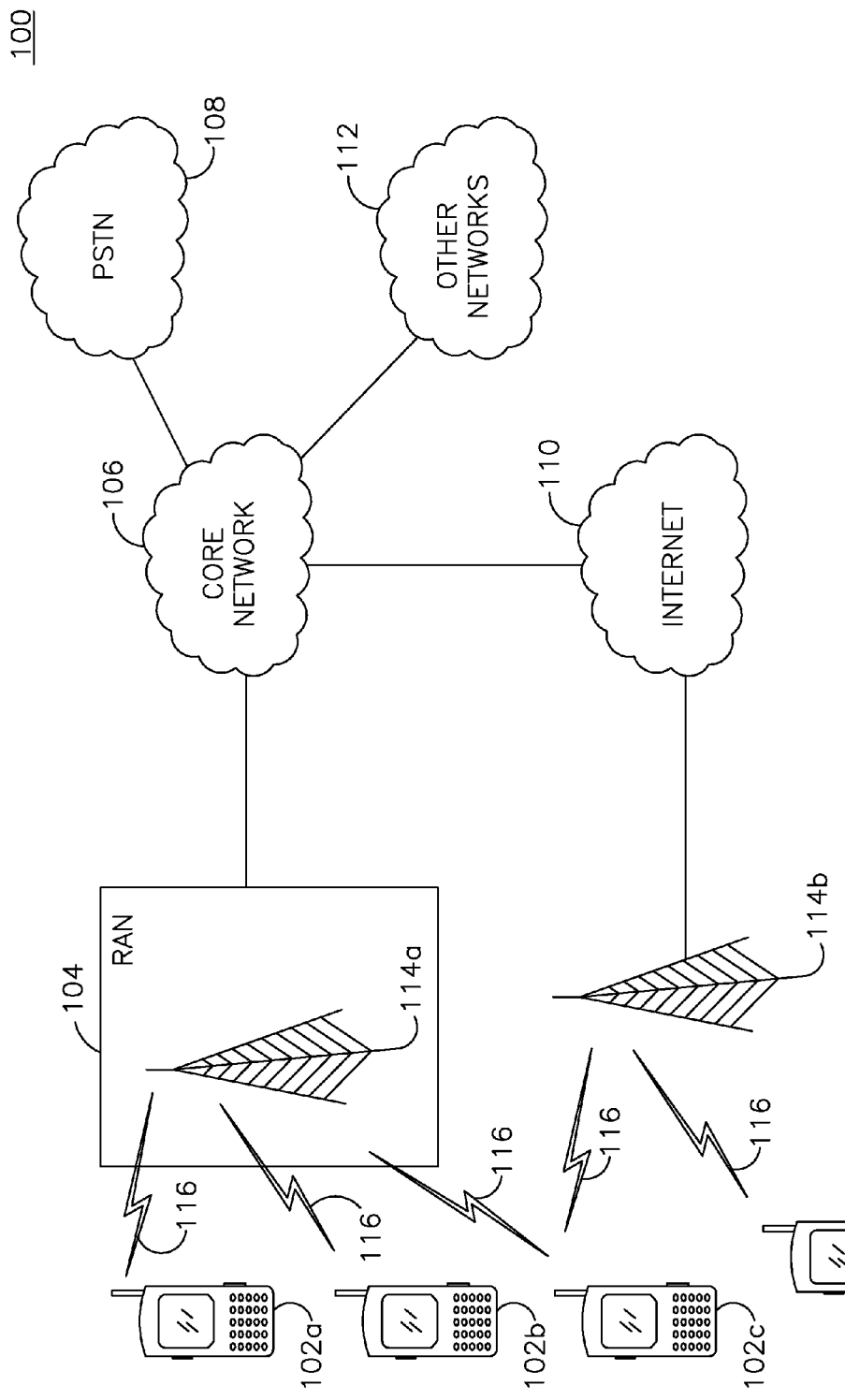
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
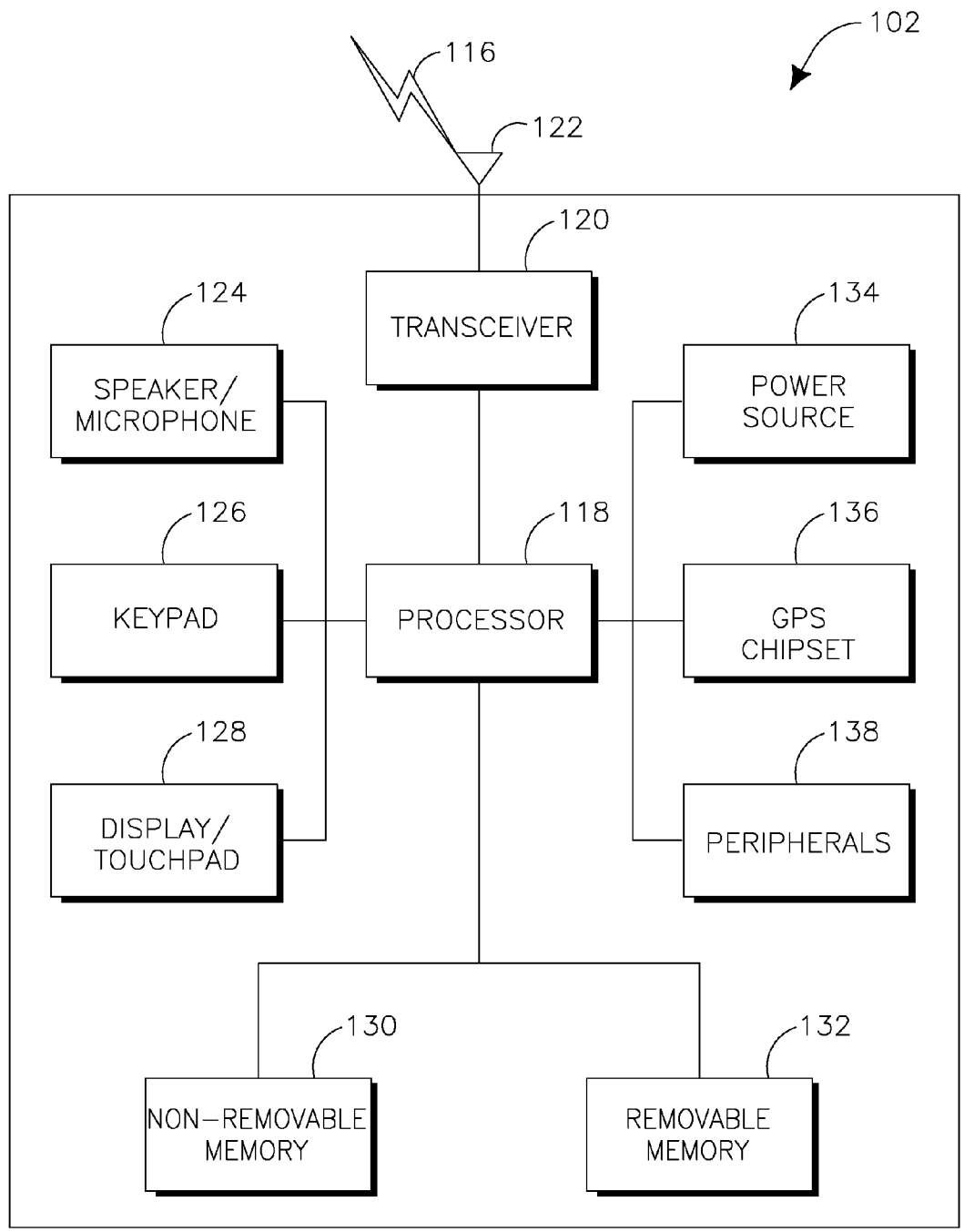
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
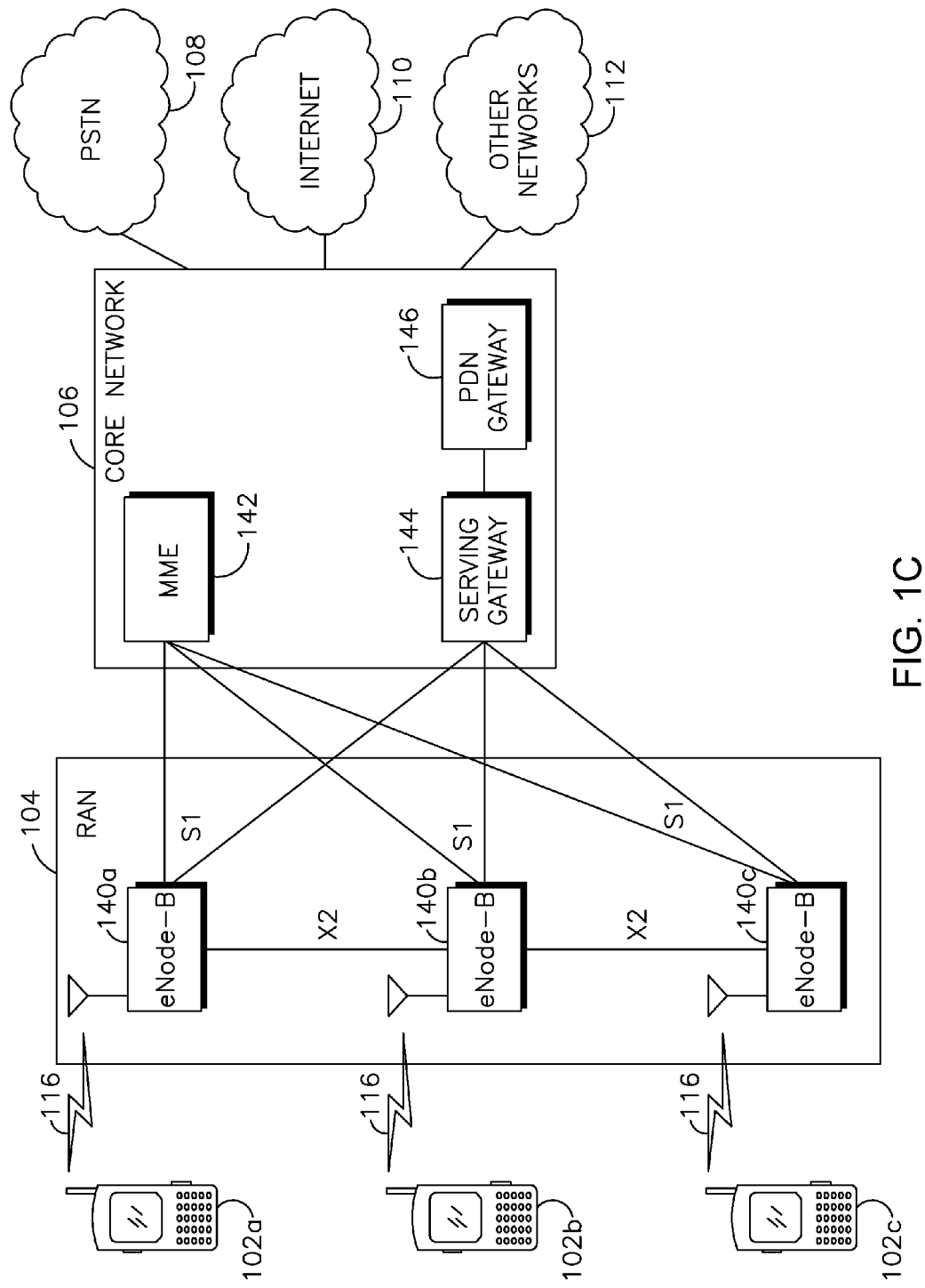
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices. An access router (AR) 150 of a wireless local area network (WLAN) 155 may be in communication with the Internet 110. The AR 150 may facilitate communications between APs 160a, 160b, and 160c. The APs 160a, 160b, and 160c may be in communication with STAs 170a, 170b, and 170c.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The description herein may use the following terms and may have the following definitions in addition to or that may supplement those used in the art. A DSM system may refer to the system comprising one (or more) DSM engines controlling and assisting various local networks and direct links. A DSM client may refer to a device that has a communication link to the DSM engine and may be part of a local network or a direct link. A DSM engine may be an entity responsible for spectrum management as well as coordination and management of local networks and direct links. A DSM link may refer to a communication link between DSM engine and DSM client, providing control plane and user plane functionality. A direct link may refer to a link between two dynamic spectrum management (DSM) clients. Operating channel(s) may be channel(s) chosen for the DSM communication links. An attachment may refer to the process by which a DSM client discovers the DSM operating channel, synchronizes to this channel, associates with the AP and informs the DSM engine of its presence and its capabilities. Discovery Process may refer to a process by which a DSM client finds the operating channel of the DSM engine, (scans to find the control channel and synchronizes to the DSM).

The descriptions herein may refer to television white space (TVWS) as an example of an opportunistic bandwidth or opportunistic frequency band. The same description may apply for operation in any opportunistic frequency bands where devices may operate opportunistically when certain defined priority users (primary users) are not operating. In addition, a database of priority users or primary users for an opportunistic band may be maintained in a database. For operation in TVWS, this database may be referred to as the TVWS database. However, operation with a similar database may be possible in any opportunistic band. Other non-limiting examples of opportunistic bands, opportunistic bandwidth or opportunistic frequency band may include unlicensed bands, leased bands or sublicensed bands.

An enabling station may refer to a station that has the authority to control when and how a dependent station may operate. An enabling station communicates an enabling signal, to its dependants, over the air. The enabling station may correspond to a Master (or Mode II) device in Federal Communications Commission (FCC) nomenclature. In the above context, "registered" may mean that the station has provided the necessary information to TVWS database, (e.g. FCC Id, location, manufacturer information, and the like).

Geo-location capability may refer to the capability of a TVWS device to determine its geographic coordinates within the level of accuracy, such as 50 meters, as a non-limiting example.

Industrial, Scientific and Medical (ISM) bands may refer to frequency bands open to unlicensed operation, governed by Part 15 Subpart B FCC rules in the US. For example, 902-928 MHz Region 2 only, 2.400-2.500 GHz, 5.725-5.875 GHz.

A Mode I device may be a personal/portable TVWS device that does not use an internal geolocation capability and access to a TV bands database to obtain a list of available channels. A Mode I device may obtain a list of available channels on which it may operate from either a fixed TVWS device or a Mode II device. A Mode I device may not initiate a network of fixed and/or personal/portable TVWS devices nor may it provide a list of available channels to another Mode I device for operation by such device. A Mode II device may be a personal/portable TVWS device that uses an internal geo-location capability and access to a TVWS database, either through a direct connection to the Internet or through an indirect connection to the Internet by way of fixed TWWS device or another Mode II TVWS device, to obtain a list of available channels. A Mode II device may select a channel itself and initiate and operate as part of a network of TVWS devices, transmitting to and receiving from one or more fixed TVWS devices or personal/portable TVWS devices. A Mode II device may provide its list of available channels to a Mode I device for operation on by the Mode I device. A sensing only device may refer to a personal/portable TVWS device that uses spectrum sensing to determine a list of available channels. Sensing only devices may transmit on any available channels in the frequency bands 512-608 MHz (TV channels 21-36) and 614-698 MHz (TV channels 38-51), for example.

TVWS bands may refer to TV channels, (in the VHF (5472, 7688, 174~216 MHz) and UHF (470~698 Mhz) bands), where regulatory authorities permit operation by unlicensed devices. Personal/portable devices which include Mode I, Mode II and sensing only devices, may transmit on available channels in the frequency bands 512-608 MHz (TV channels 21-36) and 614-698 MHz (TV channels 38-51). A primary user (PU) may refer to the incumbent user of a TVWS channel.

A method and apparatus may be used for configuring silent periods across aggregated channels in a managed WLAN system. The use of silent periods may be necessary for devices that perform sensing in order to utilize unlicensed spectrum in the TVWS bands without adversely affecting the primary users of these bands. Silent periods may also be used to determine the amount of interference on a TVWS band that may be caused by other secondary users outside of the managed system that may be utilizing the same channel. However, silent periods may result in a reduction of the throughput over the channel. Moreover, a silent period may result in a delay in traffic that may affect some time sensitive applications such as voice-over-Internet Protocol (VoIP).

Another issue that may exist with configuring silent periods in the context of multiple channels is how to ensure that out-of-band interference does not affect sensing performed by hardware (HW) that is co-located or in close proximity of the AP or stations that may be involved in transmission of the managed system. In a system that uses channel aggregation, silencing all channels simultaneously during each silent period may be performed to reduce interference. However, this strategy may result in significant throughput losses and may not be necessary depending on the type of channel that needs to be sensed, the location radio frequency (RF) properties of the sensing HW, and the managed communication devices.

Efficient configuration of these silent periods may be needed in a system using aggregated channels in order to maintain the throughput gains achieved by using aggregation. Silent periods may be configured on each of the individual physical (PHY) channels that may be used by the medium access control (MAC) aggregation scheme. The configuration of these silent periods may depend on multiple factors such as sensing requirements, knowledge of which primary users each of the channels are reserved for, and location and type of sensing radio HW.

Once silent periods have been efficiently configured, they may need to be coordinated across all nodes controlled by a central entity coordinating the sensing and silent period configuration. This coordination may require robust communication of the silent period to avoid having stations miss the silent period and result in degraded sensing results. Since a carrier sense multiple access (CSMA) system may incur some message loss, a method and apparatus may be used for ensuring that stations that miss a silent period indication do not adversely affect sensing performance.

Described herein are methods and apparatus for silent period configuration and coordination. The embodiments described herein may use both periodic and asynchronous silent periods. In order to schedule periodic silent periods over a set of aggregated channels, while maintaining channel throughput despite the presence of silent time, the silent periods may be scheduled in a non-synchronized fashion when possible. This may ensure that there is at least one channel to maintain the channel traffic on the aggregated channel link.

The description herein may use a certain number of channels for illustration purposes only. The examples and embodiments are not limited to, for example 4 channels, and may be applicable to N channels. Although TVWS may be used for illustration purposes, the methods are further applicable to any form of opportunistic spectrum where sensing through silent periods may be required.

The silent period is applicable to sensing for detection of primary users and sensing for measurement of other secondary systems for coexistence purposes.

FIG. 2 shows an example case with four channels and a channel acting as primary channel. Channel 1 may be the primary channel 205 during the majority of the time due to the quality of this channel as compared to channels 2, 3 and 4. Channel 2 may become the primary channel 210 during silent time periods 215 allocated to channel 1. FIG. 3 shows another example where the choice of a primary channel 305 may be independent of the quality of the four channels. The role of the primary channel may change in a round-robin fashion based on a silent period schedule 310, and may result in a scheme where the number of primary channel switches may be minimized.

Other examples for primary channel selection during the silent periods, such as random selection, may also be possible. Although FIGS. 2 and 3 show the same silent period interval or periodicity across the four channels, a system may manage channels that have different sensing requirements, and therefore a different amount of silent time in each channel. In this case, silent periods may be scheduled in a channel-independent fashion. The scheduling decisions, including the choice of the alternate primary channel to be used and the use of channel independent silent periods, may be made by a logical entity, such as a Silent Period Management Entity.

A channel independent silent period may allow skewing of silent periods on different channels so that there may be at least one channel in the aggregated channel set that may be used by the DSM system at any given time rather than making all channels unusable at the same time. This may benefit transmission scenarios where the application is sensitive to a delay and also may avoid the scenario where the DSM engine may not be able to send control messages for a fixed period of time.

The channel independent silent period may allow tailoring of the silent period duration on each channel based on the channel type. For example, if one channel has a larger silent period duty cycle requirement than all the other channels, the other channels may not need to be disadvantaged by this as they may maintain their own channel duty cycle requirements, if possible.

The potential for scheduling silent periods in a channel-independent fashion, either on all channels or a subset of channels, may depend on whether the out-of-band interference for channels being utilized by the managed system will cause degradation in performance in the sensing of channels when the silent period is scheduled on those channels. Since this may depend on a number of factors, such as type of sensing HW, out-of-channel and out-of-band filtering characteristics of the devices in the managed system, type of sensing to be performed, and maximum transmit power of the stations utilizing the channels in the managed systems, this information may be made available to the Silent Period Management Entity to determine the schedule. Rather than using a fixed schedule to reduce out-of-band interference, the Silent Period Management Entity may dynamically change the schedule to create one or more channel-independent silent periods over the maximum number of channels.

In addition to the use of non-synchronized and channel-independent silent periods, throughput and delay optimizations may be achieved by modifying the silent period schedule for periodic silent periods based on real-time monitoring of the channel quality. This method may be used in a single channel example as well as in aggregated channels. This method is described herein the context of an aggregated channel system, however, the same method may be applied to a system that uses a single channel (non-aggregated) scheme.

Selection of a silent period duration and periodicity may be driven by requirements on the amount of time needed to perform accurate sensing. This sensing may provide detection of primary users, or it may obtain some metric of the channel quality that may be used to dynamically select the best channels available from the TVWS.

In general, a required silent period duty cycle may be associated with each channel and this duty cycle may be derived from the silent period requirements of each channel.

A duty cycle requirement may be specified by giving the amount of silent time, x, per duty cycle interval, y, and may be referred to as an x/y requirement specification. For a given duty cycle specification, there may be multiple ways to satisfy these requirements by changing the duration and periodicity of the silent period on a specific channel.

FIG. 4 shows an example duty cycle requirement 400 of 2 ms/100 ms on a specific channel. The 2 ms of silent time duration 405 may be allocated in a single silent period over the 100 ms duty cycle interval 410. In example duty cycle requirement 450, 4 silent periods of 500 μs 455 may be distributed over a duty cycle interval 460, resulting in a periodicity of 50 ms for the silent periods. A tradeoff between throughput and delay/jitter of the resulting traffic may be expected based on selection of either of the two schedules over the other. Stations may interrupt transmission at a specific time. This action may reduce the throughput, not only due to the lack of transmission during the silent period itself, but also in the stations preparing for a silent period. A silent period in a CSMA system may be scheduled at a fixed time. Some bandwidth loss may be incurred, both prior to and following the silent period. This bandwidth loss may be due to abstaining from transmission of a packet if the acknowledgement (ACK) is not received prior to the start of a silent period, or for re-accessing the medium using CSMA following the silent period.

For fixed duty cycle requirements, when silent periods are chosen with a longer duration and longer periodicity, (for example duty cycle requirement 400 in FIG. 4), traffic delay/jitter may be sacrificed for better throughput, since the number of silent periods may be reduced over a fixed interval. When shorter silent periods are chosen and distributed over the same interval, the traffic delay/jitter caused by the silent period may be reduced. The throughput compared to duty cycle requirement 400 in FIG. 4, however, may be reduced as a result of increased channel usage reduction from switching into and out of a silent period. As a result, depending on the specific quality of service (QoS) requirement at a specific time, a different silent period configuration may be desirable over another.

A method and apparatus may be used to dynamically tailor the silent period configuration for a given duty cycle requirement to ensure that the QoS on the channels that are utilized may be satisfied in the best case. As a result, for traffic requiring low latency/jitter, silent periods that are in line with duty cycle requirement 450 may be used. In the case where the QoS requirements may dictate the need for maximum throughput, silent periods that are in line with example 1 may be used. The silent period configuration may therefore be changed dynamically with time based on changing one or more QoS requirements of the traffic utilizing each of the channels. The QoS may also be involved in the scheduling of silent period duration in asynchronous silent periods by dictating the maximum silent period duration of an asynchronous silent period.

The method and apparatus may be used to coordinate the silent periods with another station through the transmission of silent period information in a beacon. As an aggregated beacon may be employed, the silent period information may be transmitted in the aggregated beacon in order to improve robustness and avoid the scenario where a station may miss the notification of a silent period due to momentary fading. In addition, since the beacon may be missed by one or more stations due to multipath issues, collisions, and hidden node problems, a beacon dependant transmission may be implemented into the system to avoid these issues. This may require all stations that do not properly receive the beacon during a specific beacon interval to abstain from transmitting until the next beacon is received. Since the silent periods start times may be relative to the beacon times, knowledge of the exact timing of a silent period start time by each station may be dependent on the reception of the beacon that immediately precedes it. A station that does not receive the beacon may be forced to be silent during the beacon interval until the next beacon is received. This may guarantee that all stations will be silent during the silent period scheduled by the central entity.

The method and apparatus may also be used for providing efficient silent period configuration over an aggregated channel system for the DSM system. The method and apparatus may, however, be applied to a system with any architecture by assigning the logical entities described herein to different locations.

A number of assumptions may be made to illustrate the algorithm and messaging involved in the method and apparatus described herein. These assumptions should not limit the use of the method and apparatus in a system that may not use these same assumptions. The assumptions may include: 1) the use of up to 4 channels in the aggregation scheme, (in order to illustrate the scheduling examples); 2) limitation to two potential primary users—wireless microphone and digital television (DTV); and 3) a transmit radio for all devices in the DSM system that covers the TVWS using two separate wideband digital radio boards where one board may cover the lower band of the TVWS and another board may cover the upper band of the TVWS. Each board may have strong out-of-band interference rejection, however, out-of-channel interference rejection may only meet the requirements of a TVWS transmitter.

The silent period schedule may be tied to QoS. As stated hereinabove, there may be a tradeoff between delay and throughput that relates silent period scheduling to QoS. Periodic spectrum sensing may be convenient for practical implementation. In periodic spectrum sensing, in every time interval Tp, defined as the sensing period periodicity, a spectrum sensing algorithm may run to full completion to make a decision on the presence or absence of a primary spectrum user. A sensing duty cycle may be the ratio of the total time spent on spectrum sensing to the time interval Tp. For energy detection based spectrum sensing algorithms, there may be a minimum number of samples needed for a performance target. Since each sample corresponds to a sampling interval, the resulting total sensing time may be fixed.

The value of Tp may be determined by the spectrum access policies and the DSM system design, and may be fixed in practical implementations. The spectrum access policies may impose a requirement on the response time for the DSM system, and this requirement may dictate how often spectrum sensing is performed. For example, it may be required that a DSM system respond to a wireless microphone in less than 2 seconds. The response time may include the time for both spectrum sensing and the evacuation of the DSM system from the channel being used by the wireless microphone. In the DSM system design, if a fixed amount of time for the system evacuation is allocated, then the time budget left for spectrum sensing, i.e., Tp, may also be fixed.

The sensing time may be segregated into multiple time intervals while keeping the same sensing duty cycle. Each contiguous time interval for sensing may be termed a sensing duration and may be denoted as Td. Such segregation of the sensing time may offer a way to configure the sensing period. FIGS. 5A and 5B illustrate example relationships between Tp 500 and Td 505, and sensing period configuration, where Tp=T'p (510) and Td=2*T'd (515). In FIG. 5A, the sensing duty cycle=Td/Tp, and in FIG. 5B, the sensing duty cycle=2*T'd/T'p=Td/Tp.

Td may be configured based on the sensing duty cycle and a fixed value for Tp. The number of Td's within a Tp may be configured in a similar fashion. Such configurations may give rise to a tradeoff between delay and throughput. Assuming uniform packet arrivals and negligible packet lengths, the average packet delay may be proportional to Td. Thus, as Td decreases, the average packet delay may decrease. On the other hand, as Td decreases, when the effects of packet lengths are considered, the fraction of time that may be useful for data transmission decreases. This decrease may be due to a contiguous time interval available for data transmission, shown as an un-shaded time interval in FIG. 5A, that may not be able to fit multiple frames or transmission opportunities (TXOPs), and the time wasted as such may account for a larger portion as Td decreases. In addition, as Td decreases, the number of Td's within a Tp may increase. Since there may be a new round of contention after every sensing operation of duration Td, there may be more contention, which may further reduce the throughput.

There may be a lower bound on the possible values for Td, and it may be denoted as Td_min. The lower bound may occur in some applications when the sensing algorithm needs a minimum number of contiguous samples in order to accomplish the sensing task, for example, the duration of a pilot sequence used by the sensing algorithm.

In general, a silent period management entity (SPME) may be the main controller of silent periods that are used within the DSM system. This entity may be a medium access control (MAC) layer management entity that may be added to IEEE 802.11-based systems to manage the scheduling of silent periods, whether or not that system employs channel aggregation.

Figure 6:
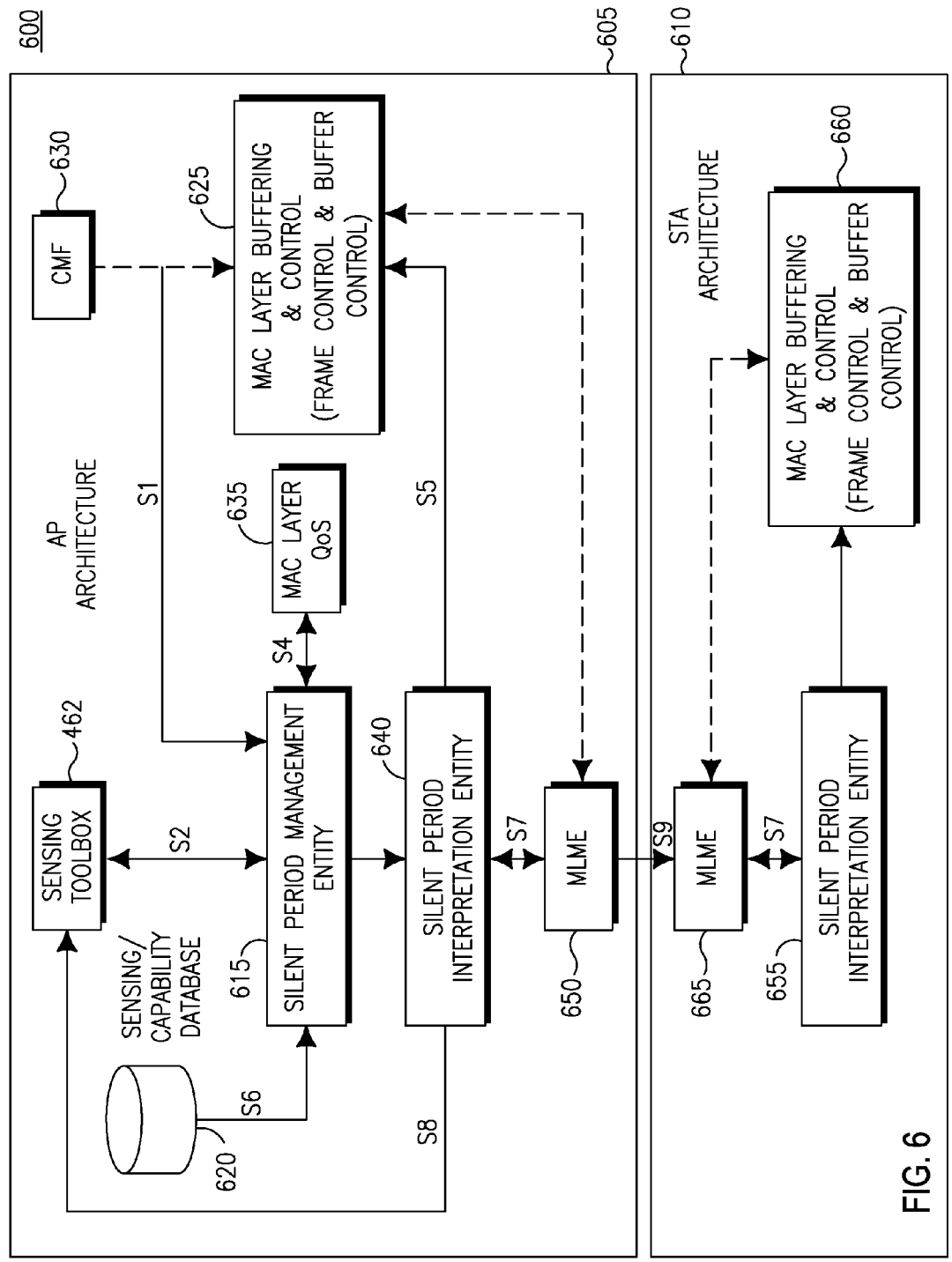
FIG. 6 is a block diagram of an example silent period management architecture.

FIG. 6 shows example DSM system architecture 600 including an access point (AP) architecture 605 and a station (STA) architecture 610. In particular, FIG. 6 shows example architecture and basic interfaces between the SPMEs and MAC layer components in the AP 605 and STA 610. Silent periods may be managed by each AP. For a DSM system that contains multiple APs, the SPME for each AP may contain an additional interface for coordination of silent periods across the multiple APs.

The AP 605 may include a SPME 615 connected to a sensing/capability database 620, a sensing toolbox 625, a channel management function (CMF) 630, a MAC QoS entity 635 and a silent period interpretation entity (SPIE) 640. The SPIE 640 may be connected to a MAC buffering and control entity 645, which in turn may be connected to a MAC layer/sublayer management entity (MLME) 650. The STA 610 may include a SPIE 655 which may be connected to a MAC buffering and control entity 660 and a MLME 665. The MAC buffering and control entity 660 may be connected to the MLME 665. The AP 605 and STA 610 may be connected through MLME 650 and MLME 665.

The main components in the DSM system 600 are described herein. Each of the entities except for the sensing toolbox/processor 625 and the CMF 630, may be MAC-layer management functions. They may therefore be integrated into a more complete MLME that contains silent period management functionality. In the architecture shown in FIG. 6, these entities may be separate from the MLME 650 to illustrate how silent period management may be added to an existing IEEE 802.11-based MLME.

The SPME 615 may be the main entity at the AP 305 that determines the length and scheduling of the silent periods on each channel in a dynamic fashion. It may handle both periodic and asynchronous silent periods. The roles of this entity may be: 1) select between channel independent and channel synchronized silent periods based on interference information from the capabilities database 620 and the maximum power transmitted by each station; 2) assign a silent period duration and periodicity for silent periods on each channel based on QoS information and duty cycle requirements; 3) jointly manage the scheduling of silent periods across the four aggregated channels in an intelligent fashion; and 4) notify the SPIE 640 of a change in the silent period schedule.

The SPIE 640 may ensure that the STA 610 adheres to the rules and timings required based on the silent period messages that are received at the STA 610 and interpreted by the STA 610 MLME 665. The SPIE 640 may receive at the AP 605 the silent period schedule derived by the SPME 615 and may implement the schedule at the MAC layer 635. The SPIE 640 tasks may include instructing the MAC buffering and control entity 645 how to buffer, reorder, and packetize frames in order to respect upcoming silent periods defined in the schedule. At the STA 610, the SPIE 655 may receive the information from the beacon as interpreted by the MLME 665. The SPIE 655 may instruct the MAC buffering and control entity 660 in the same way in order to implement the silent period from the station's perspective.

The sensing toolbox/processor 625 may coordinate the sensing of the utilized channels for determining the presence of interference or primary users (as applicable). It may control the sensing HW for any dedicated sensing boards, or sensing HW that may be located at the DSM clients.

The MAC QoS 635 may provide QoS services to the system 600 at the MAC layer. Its role, relative to silent periods, may be to provide inputs on the maximum allowable silent period duration, (for asynchronous silent periods), and to dynamically maintain the best efficiency for the silent periods in terms of the traffic type and QoS instructed by the higher layers.

The MAC buffering and control entity 645 and 660 may provide transmit buffering services, such as reordering, frame size adjustment based on channel properties and the like for the aggregated channel MAC.

The MLME 650 and 665 may be a standard MAC layer management entity as in IEEE 802.11-based systems, and may include enhancements for the support of silent periods as described herein. Some enhancements may involve the ability to interact with a MAC layer interpretation entity (not shown) and a MAC buffering and control entity, such as 645 and 660.

The CMF 630 may be the main channel selection and channel management entity in a DSM engine.

The sensing/capability database 620 may be the main repository for device capabilities. For the purposes of silent period, the information of interest in database 620 may be the sensing capabilities of the radio frequency sensing board (RFSB) and the out-of-band and out-of-channel interference properties of the AP and devices in the DSM system. This information may be entered into the sensing/capability database 620 during the attach procedure. It is then used by the SPME 615 to schedule channel-independent silent periods where possible.

Described herein are the different messages that may be exchanged across each interface in the architecture of FIG. 6, as well as the contents of these messages. The S1 interface may be used to indicate the channels currently used for aggregation by the AP 605 in the DSM system 600 and any properties of these channels required by the SPME 615 for determining the silent period schedule. It may also be used to communicate the silent period duty cycle requirements to the SPME 615. Table 1 shows some examples of S1 interface messages.

TABLE 1

| Message Name | Originator | Description | Message Contents |
|---|---|---|---|
| CHANNEL_CONFIG | CMF | Sent by the CMF to indicate the channels to be used by the AP for communication with the associated stations/clients. A CHANNEL_CONFIG may also be used to reconfigure or remove a channel from the channels to be aggregated | numChannel - Number of channels freqs - List of channels and their associated frequency range EIRP - List of maximum EIRP that can be used on each channel dbInformation - Enumeration type indicating the information obtained about this channel from the TVWS database (a channel may be free, reserved for DTV, reserved for wireless microphone, or reserved for both) |
| CHANNEL_CONFIG_CONF | Silent Period Management Entity | Confirms a CHANNEL_CONFIG message | statusCode - Success or reason code for failure |
| SET_SILENT_PERIOD_REQUIREMENTS | CMF | Sets the required duty cycle for periodic silent periods when determining the presence of DTV, or wireless microphone, as well as the current duty cycle needs for sensing for channel quality determination. These requirements may be dependent on the sensing hardware | dtvDetectionCycle - Required duty cycle needed for accurate DTV detection within timing requirements (in duty cycle of x ms per 100 ms, or x ms per interval of 100 ms). wmDetectionCycle - |

TABLE 1-continued

| Message Name | Originator | Description | Message Contents |
|---|---|---|---|
| | | capabilities available to the sensing processor, such as the number of devices performing sensing, the processing power of each device, etc. This information may be obtained from the sensing processor through message communication, or may be managed by the CMF. | Required duty cycle needed for accurate wireless microphone detection within timing requirements (in duty cycle of x ms per 100 ms, or x ms per interval of 100 ms). channelQualDutyCycle - Required duty cycle needed for channel quality measurements (in duty cycle of x ms per 100 ms, or x ms per interval of 100 ms). |
| SET_SILENT_PERIOD_REQUIREMENTS_CONF | Silent Period Management Entity | Confirms the SET_SILENT_PERIOD_REQUIREMENTS_CONF | statusCode - Success or a reason code explaining the failure. |

The S2 interface may be the interface used to communicate the need for asynchronous silent periods, (as determined by the sensing processor 625) to the SPME 615. Table 2 shows some examples of S2 interface messages.

TABLE 2

| Message Name | Originator | Description | Message Contents |
|---|---|---|---|
| ASYNCHRONOUS_SILENT_PERIOD_REQ | Sensing Processor | Message from the Sensing Processor to the Silent Period Management Entity to request an asynchronous silent period. | channelIDs - List of channel(s) on which sensing needs to be performed requestedDuration - Silent period length requested by the sensing processor |
| ASYNCHRONOUS_SILENT_PERIOD_CONF | Silent Period Management Entity | Message confirming the silent period request and indicating the number of distinct asynchronous silent periods into which the requestedDuration has been divided. The actual silent period may start with the SILENT_PERIOD_START_MESSAGE sent on the S8 interface | numDistinctSilentPeriod - The number of distinct silent periods into which requestedDuration has been split (a value of 0 indicates a failure to schedule an asynchronous silent period) duration - Duration of each distinct silent period. |

The S3 interface may be used to communicate the silent period schedule and dynamic changes in the schedule to the SPIE 640 that may implement this schedule in the MAC layer. Due to the assumption of a dual-band radio for all devices, the contents of the messages may be specific to this assumption. For a system with general radio assumptions, the message contents may change. Table 3 shows some examples of S3 interface messages.

TABLE 3

| Message Name | Originator | Description | Message Contents |
|---|---|---|---|
| PERIODIC_SCHEDULE_CONFIGURE | Silent Period Management Entity | Schedule of periodic silent periods to be implemented on the four channels as decided by | group1SilentRange - Range of frequencies that can be sensed for group 1 (to be passed to the |

TABLE 3-continued

| Message Name | Originator | Description | Message Contents |
|---|---|---|---|
| | | the Silent Period Management Entity. This message may be sent each time a new silent period configuration is determined by the Silent Period Management Entity. | sensing processor) group2SilentRange - Range of frequencies that can be sensed for group 2 (to be passed to the sensing processor) group1Duration - Duration of silent period for channels in group1. This may be a list of durations, in the case where multiple silent periods may be required on each channel (see scheduling examples) group1Periodicity - Periodicity of silent period for channels in group 1. This may be a list of periodicities, in the case where multiple silent periods may be required on each channel (see scheduling examples). group2Duration - Duration of silent period in for channels in group 2 (empty if no channels in group2). This may be a list of durations, in the case where multiple silent periods may be required on each channel (see scheduling examples). group2Periodicity - Periodicity of silent period for channels in group 2 (empty if no channels in group 2). This may be a list of periodicities, in the case where multiple silent periods may be required on each channel (see scheduling examples). |
| ASYNCHRONOUS_SILENT_PERIOD_IND | | This message indicates the immediate need to configure an asynchronous silent period on one or more group. The Silent Period Interpretation entity of the AP may automatically suspend transmitting information concerning the periodic silent period for this channel until the asynchronous silent period has been completed. At that time, the Silent Period Interpretation Entity may resume the regular periodic silent period from where they left off. | appliedGroups - Channel groups to which the asynchronous silent period applies duration - Duration of each asynchronous silent period in ms numAsync - Number of asynchronous silent periods to send in a row on the appliedGroups timeSeparation - Separation in time between asynchronous silent periods |

The S4 interface may be used to limit the silent period durations based on the measured and targeted QoS. It may focus predominantly on limiting the length of the silent periods to ensure the end-to-end delay is limited over each channel. At system initialization, the default silent period duration may be configured while maintaining the required duty cycle. For example, the duty cycle may be satisfied with a single silent period. As clients join, the QoS may request the SPME 615 to decrease the duration, (increase the periodicity), of the silent periods. Table 4 shows some examples of S4 interface messages.

TABLE 4

| Message Name | Originator | Description | Message Contents |
|---|---|---|---|
| DELAY_CHANGE_REQ | MAC Layer QoS | Request message by the MAC layer QoS block to reduce or increase the block delay experienced by a specific channel(s) as a result of a silent period. For this design, each message may request an increase or decrease in the length of the silent periods by 50%. The result of the attempt may be communicated in the DELAY_CHANGE_RESP | modifyType - Increase or decrease channelList - List of channel where delay may be increased. |
| DELAY_CHANGE_RESP | Silent Period Management Entity | Response to the DELAY_CHANGE_REQ indicating whether a change in silent period configuration request could be satisfied. | statusCode - Success or a reason code explaining the failure. |
| SILENT_AMOUNT_CHANGE_REQ | MAC Layer QoS | Request to change the amount of silent time for a channel of type "Free". This message may not be applied to any channels where sensing for primary users is being performed, since these channels may keep the silent period duty cycle fixed. | modifyType - Increase or decrease channelList - List of channel where delay may be increased. |
| SILENT_AMOUNT_CHANGE_RESP | Silent Period Management Entity | Response to the SILENT_AMOUNT_CHANGE_REQ indicating whether a change in silent period configuration requested may be satisfied. | statusCode - Success or a reason code explaining the failure. |
| MAX_ALLOWABLE_ASYNC_DELAY_REQ | Silent Period Management Entity | Sent by the Silent Period Management Entity to obtain the maximum allowable silent period duration for an asynchronous silent period requested by the sensing processor. | channelList - List of channels that require the silent period. |
| MAX_ALLOWABLE_ASYNC_DELAY_RES | MAC Layer QoS | Response to the MAX_ALLOWABLE_ASYNC_DELAY | maxDelayVal - Maximum delay in ms. minSeparation - Minimum separation time between asynchronous silent periods if the requested silent period is split into multiple pieces. |

The S5 interface may communicate the presence of a silent period and the required action to be taken by the Buffering and Control Entity in order to ensure data transmission on each of the aggregated channels may be maintained efficiently despite the presence of silent periods. This interface may exist both at the AP 605 and the STA 610 and is identical in each case. Table 5 shows some examples of S5 interface messages.

TABLE 5

| Message Name | Originator | Description | Message Contents |
|---|---|---|---|
| SILENT_PERIOD_ARRIVAL | Silent Period Interpretation Entity | Notifies the Buffering and Control Entity of an upcoming silent period that may require | duration - Duration of the upcoming silent period timeExpected - Expected time when the silent |

TABLE 5-continued

| Message Name | Originator | Description | Message Contents |
|---|---|---|---|
| | | reordering and/or modification of frame fragmentation to ensure buffers remain equal length. This message may be the same for the S5 interface on the AP and the station. In the case of an asynchronous silent period, the message may be sent with little or no advanced notice (depending on whether we are on the AP or station side respectively). | period will occur (this may be an approximation since the MLME may maintain the exact timing). When a value of 0 is sent, this means that the silent period has already begun. channelsAffected - The list of PHY channels that may be silenced. |

The S6 interface may be used by the SPME 615 to obtain information about the sensing capabilities and transmit/receive (TX/RX) radio capabilities of the AP 605 and STAs 610 in the DSM system 600. Using this information, the SPME 615 may determine which radio bands may be sensed simultaneously while normal data transmission is occurring on other bands. Table 6 shows some examples of S6 interface messages.

TABLE 6

| Message Name | Originator | Description | Message Contents |
|---|---|---|---|
| GET_SENSING_RADIO_CAPABILITIES | Silent Period Management Entity | Sent to request information about the sensing radio capabilities and restrictions that may affect the silent period configurations | None |
| SENSING_RADIO_GETCAPABILITIES | Sensing/ Capability Database | Response to the GET_SENSING_RADIO_CAPABILITIES message | group1DependencyRange - Range of channels in the first dependency group group2DependencyRange - Range of channels in the second dependency group. |

The S7 interface may include MLME service access point (SAP) primitives to implement the silent periods through beacon and control messages. At the AP 605, the SPIE 640 may indicate to the MLME 650 the timing of the silent periods, (periodic and asynchronous), so that this timing may be incorporated appropriately in the beacon and control messages sent to the stations. At the station, the MLME 650 may interpret the beacon and control frames and send all silent period scheduling information to the SPIE 640. Table 7 shows some examples of S7 interface messages.

TABLE 7

| Message Name | Originator | Description | Message Contents |
|---|---|---|---|
| MLME_SILENT_SCHEDULE_CONFIGURE | Silent Period Interpretation Entity | This primitive may set up beacon information for periodic silent periods in each of the channels. | channelGroup1 - List of channels associated with the first synchronous silent period. This group may be decided by the Silent Period Management Entity based on several inputs (see call flows) channelGroup2 - List of channels (up to 3) associated with the second synchronous silent period. This group may be empty. |
| MLME_SILENT_PERIOD_START | MLME | Sent by the MLME to indicate the exact starting time of a silent period. | None |
| MLME_START_ASYNC_PERIOD | Silent Period Interpretation Entity | MAC layer primitive that requests the MLME to start an asynchronous silent period and consequently suspend any synchronous silent periods that may be occurring on the same frequency. | duration - Required duration of the silent period moreFlag - Whether more asynchronous silent periods are expected or if periodic silent periods may be rescheduled following this asynchronous silent period. phyChannels - List of PHY channels on which the asynchronous silent period applies. |
| MLME_QUIET_INFORMATION | MLME | This message may be used at the station only. It may send the quiet information received in the beacon to the Silent Period Interpretation Entity for management of the timing of the silent periods. | The quiet information element on each of the channels may be received (see section TBD for details). |

The S8 interface may carry the timing information about the silent periods, (exact start time, duration, and bands), so that the sensing processor 625 may know when a sensing operation for a specific channel or set of channels should be started. Knowledge of this exact timing information may be ensured by a message from the MLME 650 to the SPIE 640 across the S7 interface. Table 8 shows some examples of S8 interface messages.

TABLE 8

| Message Name | Originator | Description | Message Contents |
| --- | --- | --- | --- |
| SILENT_PERIOD_INFORMATION | Silent Period Interpretation Entity | Indicates to the Sensing Processor the properties of an upcoming silent period message. This message may be sent some time prior to the occurrence of the silent period to allow confirmation. | freqRanges - Range of frequencies (delimited by start and end frequencies). duration - silent period duration applicable to freqRange (each silent period start message may be associated with a single duration time) |
| SILENT_PERIOD_INFORMATION_CONFIRM | Sensing Processor | Confirms the receipt of the silent period information message. | statusCode - Success or a reason code explaining the failure. |
| SILENT_PERIOD_START_MESSAGE | Silent Period Interpretation Entity | Indicates the exact starting time of the silent period | None |

The S9 interface may be used to communicate the silent periods from the AP 605 to each of the STAs 610. This interface may be implemented through information in the beacon and control messages.

Figure 7A:
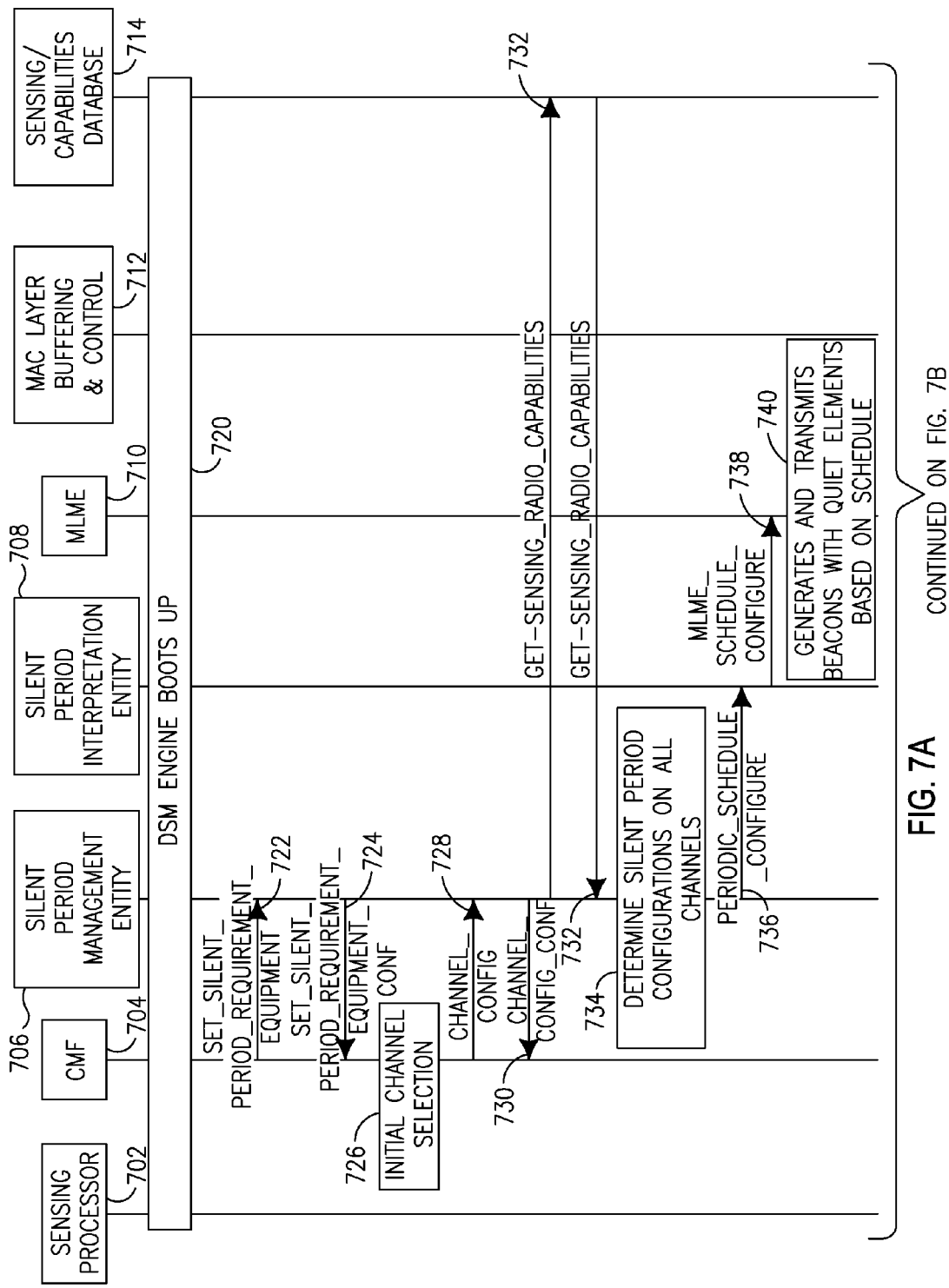
FIGS. 7A and 7B are flow diagrams of an example system initialization and silent period initiation method.
Figure 7B:
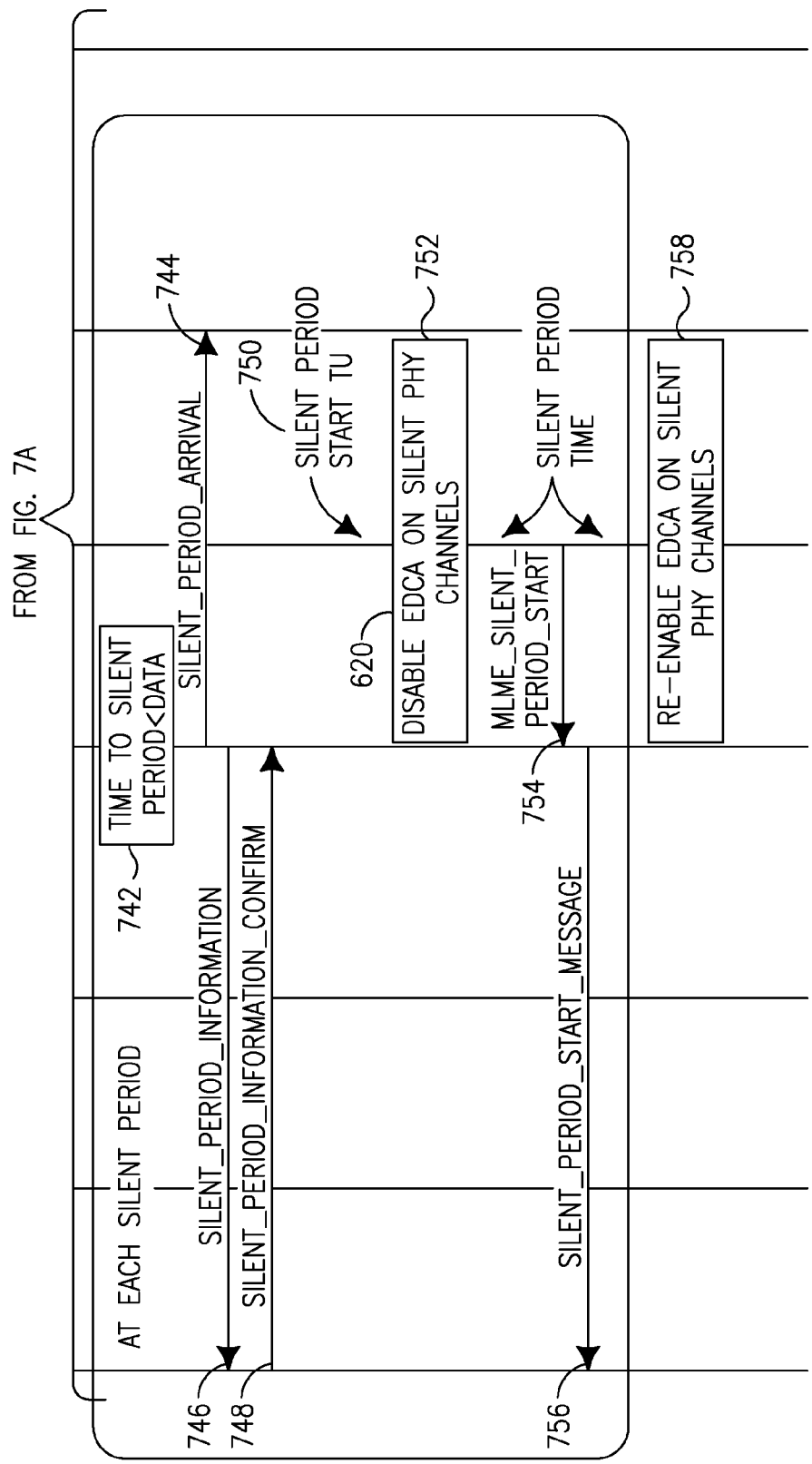

The following call flow examples describe the main messages and their uses in the different scenarios where the silent period management may occur. FIGS. 7A and 7B are flow diagrams of an example system initialization and silent period initiation method 700. A DSM system may include interaction between a sensing processor 702, a CMF 704, a SPME 706, a SPIE 708, a MLME 710, a MAC buffering and control entity 712 and a sensing/capabilities database 714.

When the DSM system boots up (720), the SPME 706 may receive the silent period requirements for each type of primary user interference (722) and send a confirmation (724). This information may guide the SPME 706 in creating the silent period schedule. When the CMF 704 selects the channels to be used by the system (726), it may send a CHANNEL_CONFIG message across the S1 interface to the SPME 706 (728), which in turn may send a confirmation (730). This message may also include additional information about the type of sensing that may be performed based on the dbInformation parameter within the message (732). If the channel is free, based on the TVWS database, this channel may be used as a channel used in a Mode I and a Mode II operation. If the channel is considered occupied, then it may be used by a sensing only mode device and primary user detection may be required. If additional information is present from the TVWS database, (whether the primary user is known to be sensing only or DTV), that may be reflected in this parameter.

The SPME 706 may generate a schedule based on the default settings related to QoS (734) and may send this schedule to the SPIE 708 (736). This schedule may then be sent to the MLME 710 through an MLME primitive (738) so that the MLME 710 may begin to include this information within the beacon (740).

At some time delta prior to the arrival of a silent period (742), the SPIE 708, which may be maintaining the latest schedule, may notify the MAC buffering and control entity 712 so that it may adjust its frame buffering rules for the arrival of a silent period (744). Information about the upcoming silent period may be sent to the sensing processor 702 (746), which in turn may send a confirmation (748).

The MLME 710 may determine the start of the silent period based on knowledge of the beacon timing for silent periods starting immediately following the beacon, or based on the target transceiver unit (TU) of the silent period for silent periods occurring within the beacon interval (750). When the silent period time arrives, the MLME 710 may disable the channels affected by the silent period within the Enhanced Distributed Channel Access (EDCA) algorithm (752) and may send a message to the SPIE 708 (754) that may be forwarded to the sensing processor 702 for synchronizing the sensing operation (756). Depending on the implementation, advanced notice may be sent in order to account for messaging latencies with the sensing processor 702. After the silent period ends, the MLME 710 may re-enable the channels affected by the silent period within the EDCA algorithm (758). This may be done for each silent period.

Figure 8:
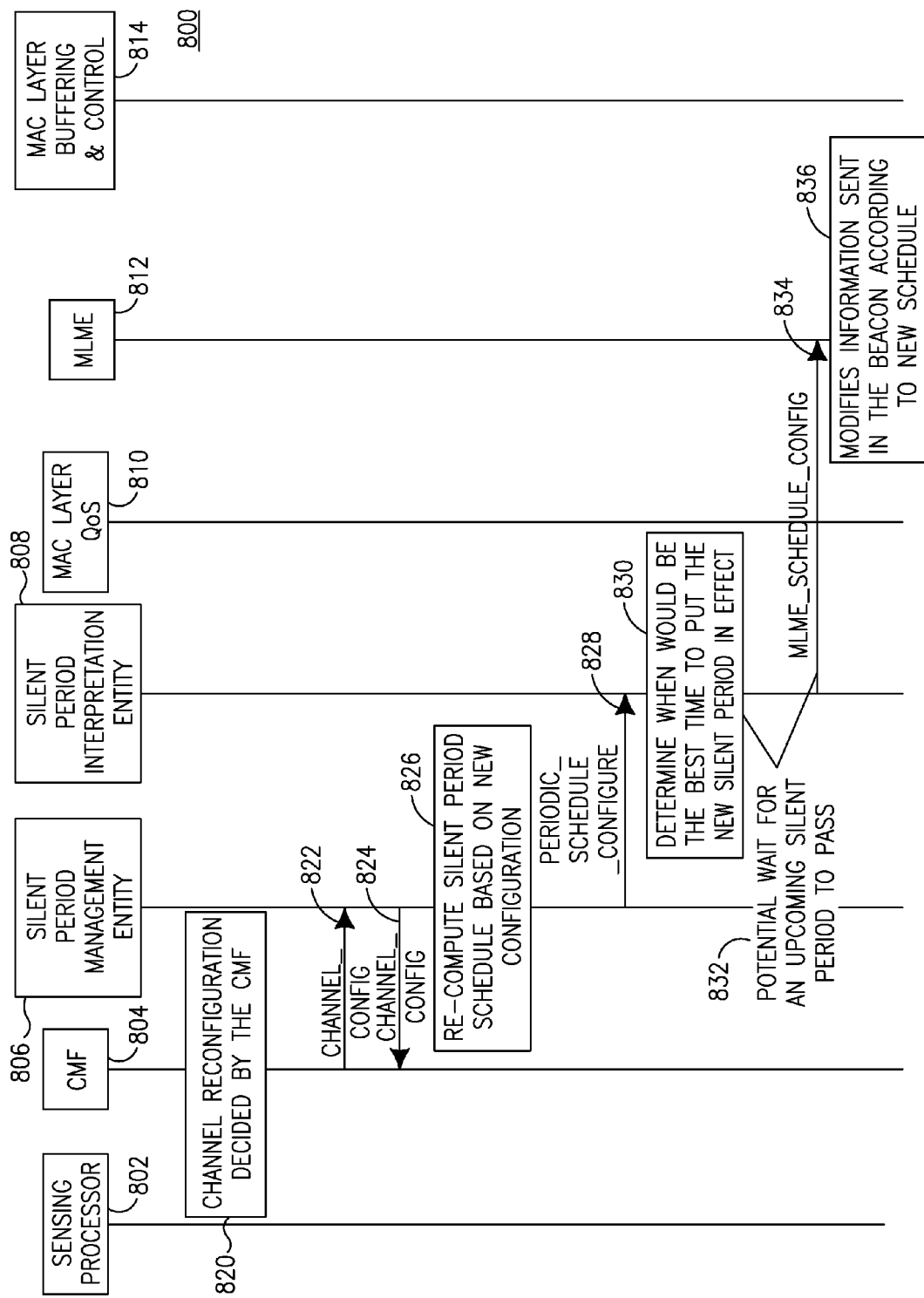
FIG. 8 is a flow diagram of an example channel reconfiguration method.

FIG. 8 is a flow diagram of an example channel reconfiguration 800 performed by a CMF 804 in a DSM system. The DSM system may include interaction between a sensing processor 802, a CMF 804, a SPME 806, a SPIE 808, a MAC QoS 810, a MLME 812 and a MAC buffer and control entity 814.

The CMF 804 may decide to change the active channels for various reasons during operation of the DSM system (820). The change in channels may involve a change in the active channels used by the aggregation, or a decrease in the channels followed by an eventual increase when a new available channel is found. In each case, the CMF 804 may send a CHANNEL_CONFIG message with a new set of active channels to the SPME 806 (822), which in turn may send a confirmation (824). The SPME 806 may be responsible for re-computing a new silent period schedule for the periodic silent periods (826). When the new silent period schedule has been sent to the SPIE 808 (828), the SPIE 808 may decide the best new time to have the new schedule take effect (830). This may result in the delay of the MLME_SCHEDULE_CONFIGURE primitive until an upcoming silent period occurs (832). The delay may occur if that silent period is less than the delta from the reconfiguration time, or if sensing information may be obtained from the upcoming silent period, such as, for example, alternate channel sensing information. After the delay lapses, the SPIE 808 may send the MLME_SCHEDULE_CONFIGURE primitive to the MLME 812 (834), which in turn may modify the information sent in the beacon according to the new schedule (836).

Figure 9A:
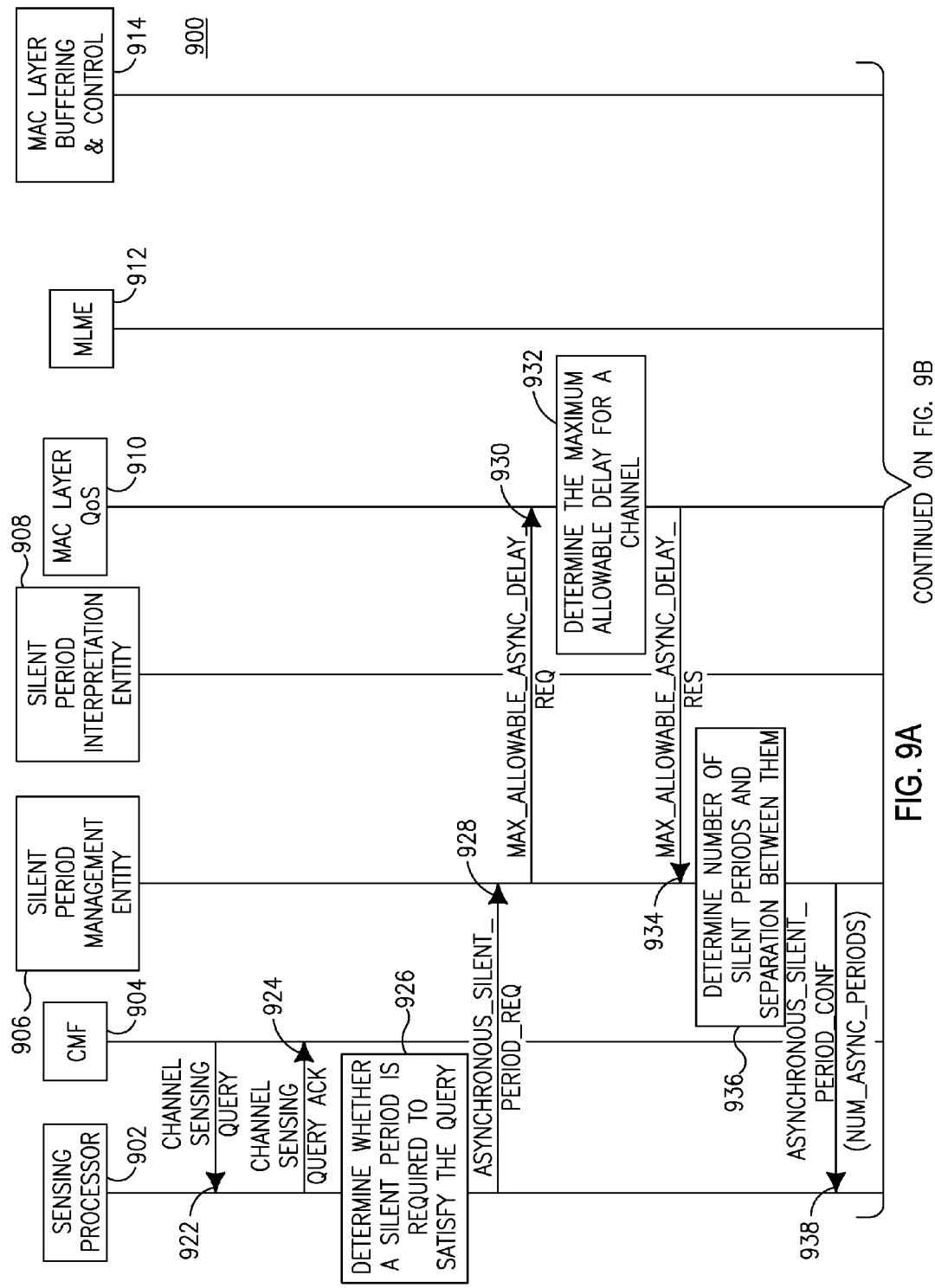
FIGS. 9A and 9B are flow diagrams of an example asynchronous silent period configuration method.
Figure 9B:
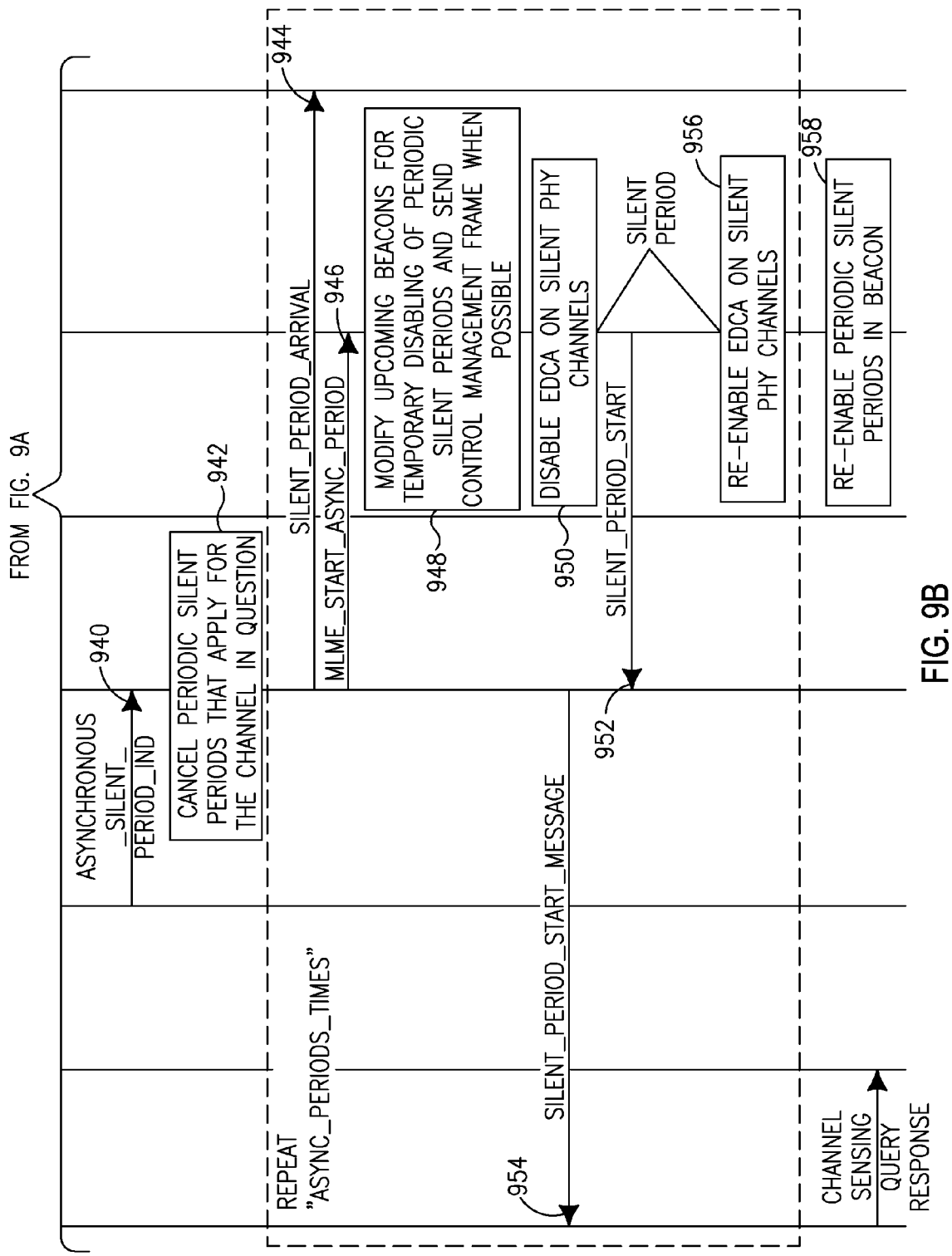

FIGS. 9A and 9B are flow diagrams of an example asynchronous silent period configuration method 900. The DSM system may include interaction between a sensing processor 902, a CMF 904, a SPME 906, a SPIE 908, a MAC QoS 910, a MLME 912 and a MAC buffer and control entity 914.

During communication between the CMF 904 and the sensing processor 902 for channel selection/evaluation (922 and 924), the sensing processor 902 may decide that an asynchronous silent period is required (926). An asynchronous silent period may be required where a channel is evacuated due to a primary user or strong interference, and an alternate channel is not yet available. In order to speed up the selection of a new channel for the system, the sensing processor 902 may request an asynchronous silent period to perform sensing on alternate channels (928). The SPME 906 may check this request with the MAC QoS entity 910 (930) to determine the maximum allowable silent period that is acceptable for a given channel (932). Based on the maximum allowable delay and, optionally, the minimum time between two asynchronous silent periods having that delay sent by the MAC QoS entity 910 (934), the SPME 906 may split the requested silent period from the sensing processor 902 into multiple asynchronous silent periods (936). This information may be sent to the sensing processor 902 (938) as well as the SPIE 906 (940).

The SPIE 908 may cancel any ongoing periodic silent periods for the affected channels within the maintained schedule (942) and begin a procedure for starting a silent period with the MAC buffer and control entity 914 (944) and MLME 912 (946). The MLME 912 may disable the periodic silent period on any affected channels as requested by the SPIE 908 at the receipt of the first MLME_START_ASYNC_PERIOD primitive (948). The MLME 912 may disable the channels affected by the silent period within the Enhanced Distributed Channel Access (EDCA) algorithm (950) and may send a message to the SPIE 908 (952) that may be forwarded to the sensing processor 902 for synchronizing the sensing operation (954). Depending on the implementation, advanced notice may be sent in order to account for messaging latencies with the sensing processor 902. After the silent period ends, the MLME 910 may re-enable the channels affected by the silent period within the EDCA algorithm (956). The MLME 912 may also re-enable periodic silent periods on these channels after the last asynchronous silent period is received (958). The MLME may keep track of when the control frame has been sent by the physical (PHY) entity and may trigger the MLME_SILENT_PERIOD_START primitive to the SPIE 908 accordingly.

Figure 10:
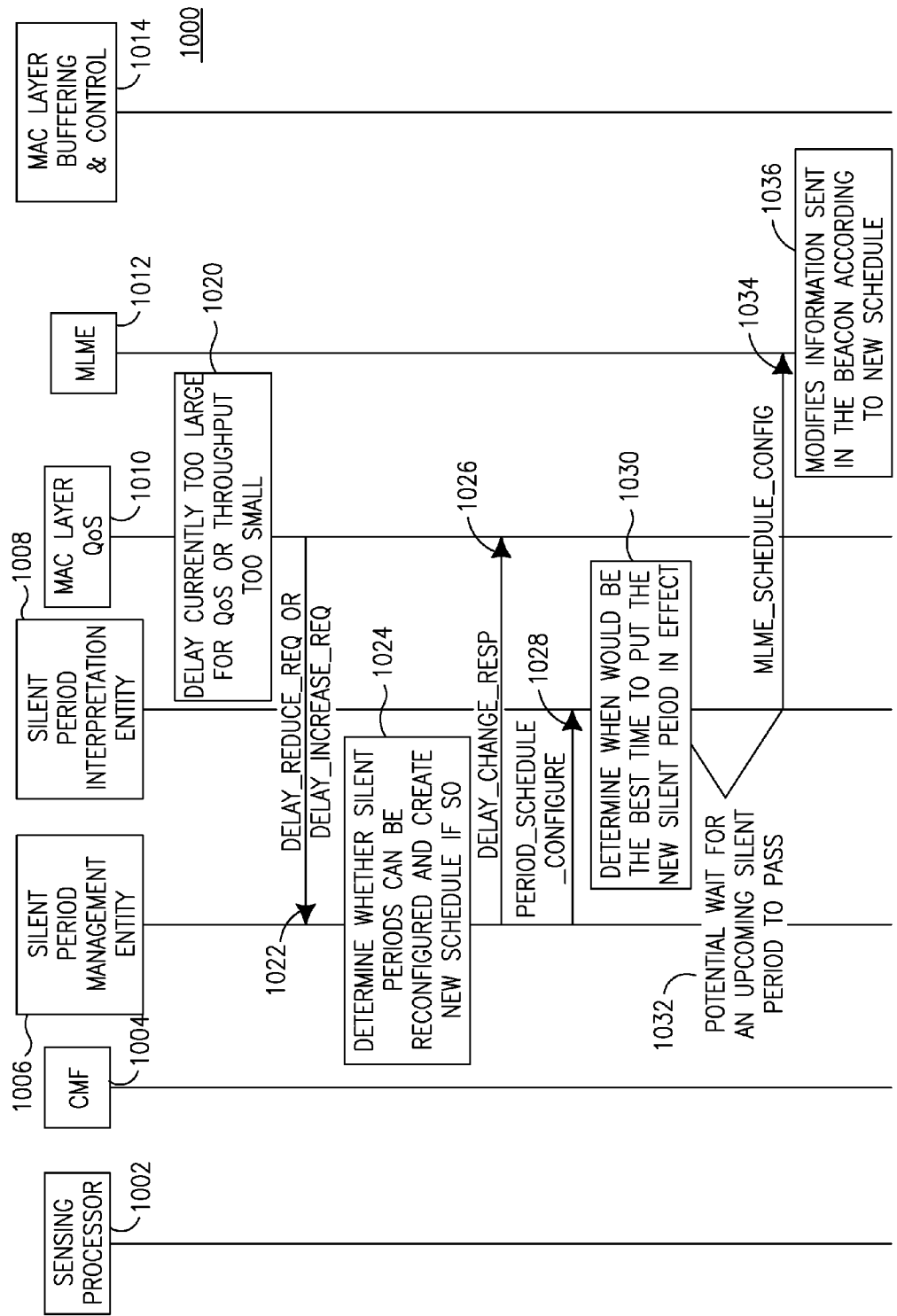
FIG. 10 is a flow diagram of an example quality of service (QoS) requirements change method.

FIG. 10 is a flow diagram of an example QoS requirement change method 1000. The DSM system may include interaction between a sensing processor 1002, a CMF 1004, a SPME 1006, a SPIE 1008, a MAC QoS 1010, a MLME 1012 and a MAC buffer and control entity 1014.

The MAC QoS entity 1010 may determine based on delay or throughput characteristics on certain channels that the configuration of the silent period may need to be changed (1020). In general, for a given duty cycle requirement, when the duty cycle requirement is satisfied using longer silent periods, the overall throughput may be greater but the application delay may also increase. On the other hand, when more and shorter silent periods are used, the application delay may be smaller but the overhead at the MAC layer or entity, (due to traffic pausing and restarting), may cause degradation to the overall throughput. The silent period duration may be managed in such a way as to optimize the QoS based on measurements made at the MAC QoS entity 1010. The MAC QoS entity 1001 may indicate to the SPME 1006 when it requests an increase or decrease in the delay (1022). The SPME 1006 may create a new schedule for the periodic silent periods based on this request (1024), if possible and may send a DELAY_CHANGE_RESP message to the MAC QoS entity 1010. The SPIE 1008 may receive the new schedule (1028) and may then determine the best time for implementing the new schedule (1030). The SPIE 1008 may wait for a silent period to pass (1032) and may then send a MLME_SCHEDULE_CONFIGURE message to the MLME 1012 (1034), which in turn may modify the information being sent in the beacon in accordance with the new schedule (1036).

Figure 11:
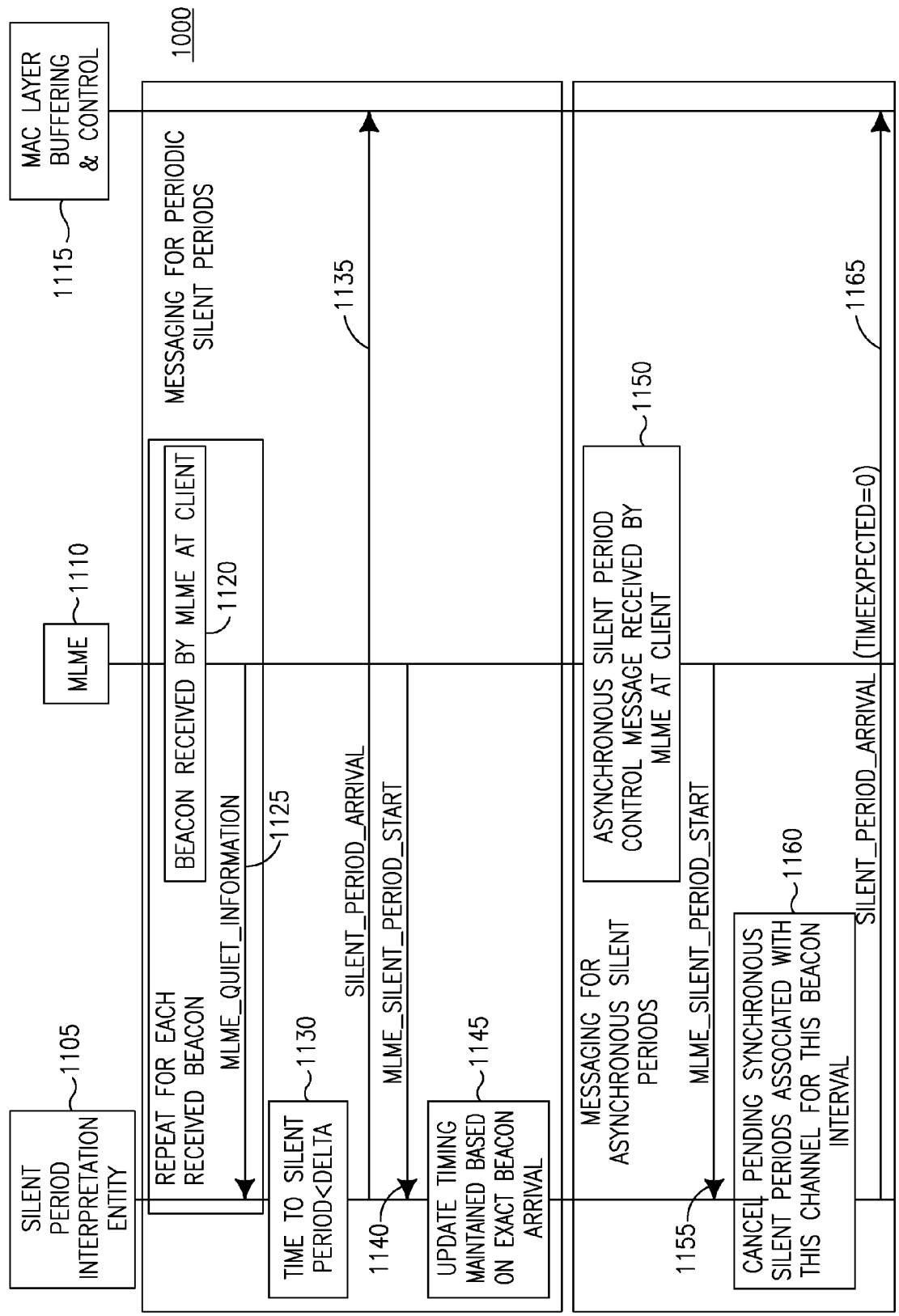
FIG. 11 is a flow diagram of an example method for using messages at a DSM client or a station.

FIG. 11 is a flow diagram 1100 of an example for using messages at DSM clients and/or stations. The call flow example in FIG. 11 illustrates the messages used in the case of both periodic and asynchronous silent periods. The entities at a DSM client may include a SPIE 1105, a MLME 1110, and a MAC buffering and control entity 1115. These entities may communicate using a reduced set of messages that may be defined over each interface. DSM clients may be aware of the presence of a silent period based on the arrival of beacon and control messages in the form of management frames received by the station MLME 1110 (1120). The MLME 1120 may send the silent period information to the SPIE 1105 (1125), which in turn may send a SILENT_PERIOD_ARRIVAL message to the MAC buffer and control entity 1115 (1135) when a silent period is about to start (1130). The SPIE 1105 may receive a MLME_SILENT_PERIOD_START message (1135) when the silent period starts (1140) and may update timing based on exact beacon arrival (1145).

With regard to asynchronous silent periods, DSM clients may be aware of the presence of a silent period based on the arrival of an asynchronous silent period control message in the form of management frames received by the station MLME 1110 (1150). The SPIE 1105 may receive a MLME_SILENT_PERIOD_START message (1155), cancel pending synchronous silent periods associated with this channel for this beacon interval (1160) and may send a SILENT_PERIOD_ARRIVAL message to the MAC buffering and control entity 1115 (1165).

As described herein, the SPME schedules silent periods. Based on the call flows described herein, a scheduling algorithm such as the creation of a schedule based on all available information, may be performed at the SPME at several instances in time. This algorithm may first process the information that is obtained from the capabilities database to generate the rules that it may use to define the schedule. These rules may remain fixed, unless they depend on the arrival of a new device with sensing capability or transmission (TX) band properties that may change the out-of-band interference assumptions.

Given this set of scheduling rules, the SPME may create a schedule for the silent periods for each of the channels each time the following events occur: 1) the CMF may change the channels utilized by the system and the current silent period schedule may be changed to avoid interference from transmitting stations affecting the sensing results; 2) the duty cycle requirements from the sensing toolbox may have been changed due to the arrival of a new device with sensing capability, (or the departure of a sensing device; and 3) the current QoS requirements of the utilized channels may have changed and the current silent period schedule may not give the best QoS performance for the new requirements.

Silent periods may be scheduled using the required duty cycle for each type of channel. When a required duty cycle is specified, the SPME may ensure that the amount of sensing time specified by the duty cycle may be allocated in terms of silent time. In order to simplify the silent period scheduling, duty cycles indicated in the SET_SILENT_PERIOD_REQUIREMENTS message may be given in terms of time per 100 ms or time per multiple of 100 ms. For example, 5 ms/100 ms, 1 ms/100 ms and 10 ms/300 ms are valid duty cycles.

In order to link a duty cycle with each of the channels, a particular channel may be associated with a channel type. This channel type may be sent to the SPME with each CHANNEL_CONFIG message. An example of each of the channel types that may be associated with a TVWS channel is shown in Table 9. Some arbitrary duty cycle requirements are shown to indicate how these requirements may be attached to each channel by the sensing processor, (through the SET_SILENT_PERIOD_REQUIREMENT).

TABLE 9

| Channel Type ID | Channel Type (from the dbInformation parameter) | Duty Cycle Requirement |
|---|---|---|
| Channel Type 1 | Reserved for Wireless Microphone | 2 ms/100 ms |
| Channel Type 2 | Reserved for DTV | 2 ms/100 ms |
| Channel Type 3 | Reserved for DTV and Wireless Microphone | 4 ms/100 ms |
| Channel Type 4 | Free | No requirement (default is 1 ms/1000 ms) |

Figure 12:
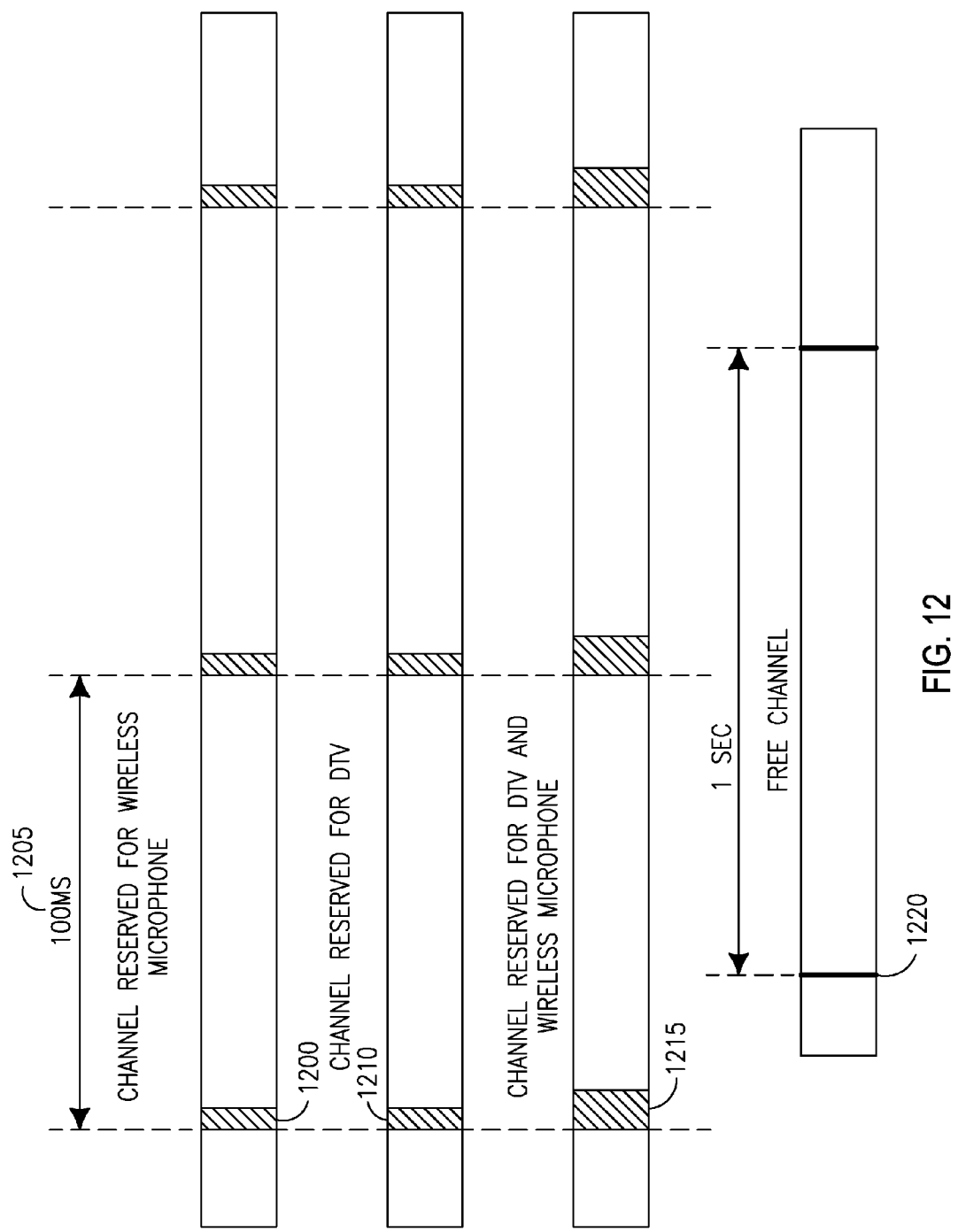
FIG. 12 is a diagram of example default silent period lengths and periodicities.

By default, the SPME may allocate the duty cycle requirement in a single portion of silent time, as shown in FIG. 12. Based on the hypothetical values in Table 9, a silent period 1200 of duration 2 ms may occur with a period 1205 of 100 ms for a channel reserved for a wireless microphone, for example. Other silent periods 1210, 1215 and 1220 may depend on type of channel reservation or free channel status.

Silent periods allocated by the SPME over the four aggregated channels may be either channel synchronous or channel independent. When channel synchronous silent periods are used, all four channels may exhibit a silent period simultaneously. This means that the duration and periodicity of the silent periods on all channels may be the same. When channel independent silent periods are used, there may be one or more channels that may be performing data transmission, while one or more other channels may be performing a silent period.

In channel synchronous silent periods, the silent periods of all channels may match the worst case duty cycle of the four channels. The change in silent period configuration that may be commanded by the MAC QoS entity may apply to all of the four channels. For example, if the MAC QoS entity requests a decrease in delay, and the worst case duty cycle required is that of wireless microphone, the silent periods may change from 2 ms every 100 ms to 1 ms every 50 ms, for example, and this may occur on every channel. A minimum silent period duration may be adhered to for each channel type. This minimum may be dependent on the sensing hardware, and may be provided in the SET_SILENT_PERIOD_REQUIREMENTS message. Channels that do not have a duty cycle requirement, for example a channel of type "Free" as defined hereinabove, may have silent periods cancelled as determined by the MAC QoS entity.

An example implementation for the SPME may be based on some hypothetical assumptions to illustrate application of the methods described hereinabove. A wideband digital radio may be assumed for both device and AP transceiver (TRX) operations as well as for sensing operations. It may be assumed that the radio that performs the sensing is a different radio than the AP TRX radio, and may or may not be collocated with the AP. The digital radio may include two separate radio boards: a low-band board that may transmit over the 512-608 MHz frequency range and a high-band board that may transmit over the 614-698 MHz frequency range. Analog filtering may be applied only on a band basis, for example low band or high band. As a result, transmission on any TVWS channel in the low-band may create interference over the entire low band, and this interference may be limited only to the out-of-band transmission requirements of adjacent TVWS channels that may be ensured by digital filtering. This interference may create problems with sensing of wireless microphone and DTV signals, where the requirement is to detect signals below the noise floor, even when this sensing may be performed by a separate radio. As a result, sensing for wireless microphone and DTV signals may require a silent period that is "band-wide" such that the silencing is of the entire low-band or high-band and may depend on the location of the channel on which sensing is being performed.

The requirement of band-wide silencing may depend on the following factors. If wireless microphone or DTV sensing must be performed on a particular channel, transmission on other channels that are in the same band, (low-band or high-band), may need to be silenced as well. The decision on the necessity of silencing the other channels may depend on the second factor. In the case of sensing a channel of type "Free", where only channel quality may be required, this may be performed without the need for silencing other channels within the same band. The expected interference caused by a separate sensing radio may be below the sensitivity of a WiFi terminal (~−85 dbm). If the sensing radio being used is far enough from all of the devices transmitting, the interference created by the devices that are transmitting in the vicinity may be below the detection level of wireless microphone and DTV. In this case, independent silent periods may be used.

The information needed to distinguish the scenario based on the above two factors may reside in the capabilities database that is read by the SPME. It may be assumed that the SPME has made this decision and the silent period configuration is chosen accordingly.

The following scenarios illustrate the potential silent period schedules maintained and controlled by the SPME. The durations and periodicity values used in the illustrations serve only as examples to show how the schedule is derived based on the channel type, the allocation of channels to each radio band, and dynamic requests from the MAC QoS entity. The rules used by the SPME in each scenario are listed in Table 10.

TABLE 10

| Rule | Description |
| --- | --- |
| Duty Cycle | For all channel types except "Free", the minimum duty cycle requirement may be maintained. For a channel of type "Free", the duty cycle may be changed with commands coming from the QoS Entity. |
| Silent Period Distribution | The distribution of all silent period may be such that all silent periods (independent or synchronous) may be evenly distributed over a cycle so that the Sensing Processor will have a maximum amount of post-processing time available to it. |
| Dependence of Silent Periods | When silent periods on different channels need to be channel synchronous due to interference considerations, all dependant channels may inherit the silent period duration and timing of the channel with the worst case duty cycle requirements. All channel types may inherit the silent period timing of Channel Type 1. Channel Type 4 may inherit the silent period timing of both Channel Type 2 and Channel Type 3 as well. When a change in the silent period configuration is requested by the MAC Layer QoS, that same configuration change may be applied all channels that have channel synchronous silent periods. |
| Behavior during DELAY_CHANGE_REQ. | When a DELAY_CHANGE_REQ of type decrease is received, the silent period(s) for a particular channel and its dependant channels may be split into two equal portions and redistributed to maintain the Silent Period Distribution Rule. When a DELAY_CHANGE_REQ of type increase is received, silent periods for the channel may be merged in pairs to return to the configuration for that channel that existed prior to previous decrease requests. |
| Behavior during SILENT_AMOUNT_CHANGE_REQ | This message may have an effect only on Channel Type 4. When a SILENT_AMOUNT_CHANGE_REQ is received, each silent period duration may be either doubled (increase) or halved (decrease). A decrease request made when the silent period is the minimum required value may cancel the silent periods. An increase request made on a channel where the silent periods have been cancelled may introduce a silent period of the minimum required with a periodicity of 1000 ms. |

Figure 13:
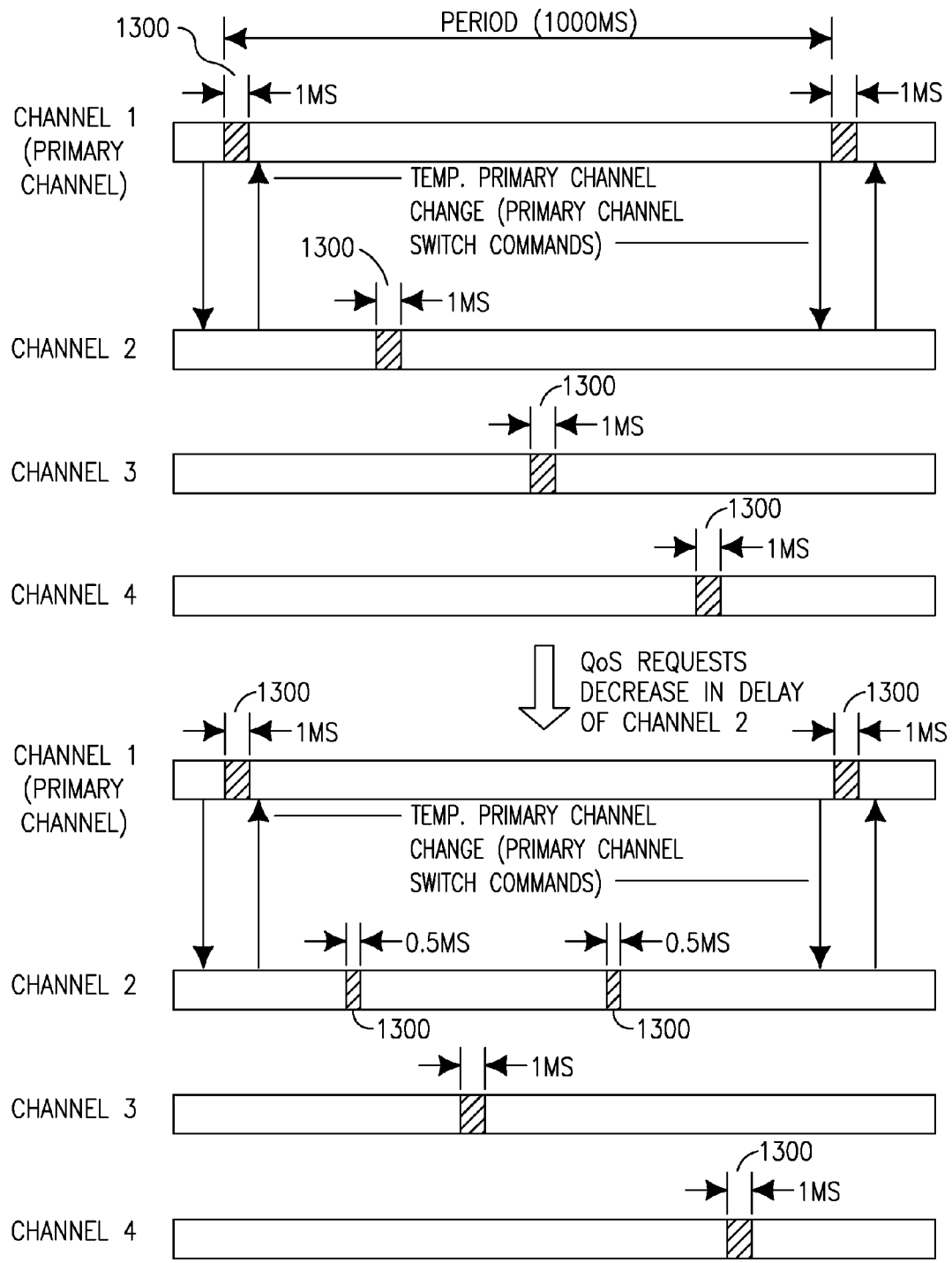
FIG. 13 is a diagram of an example silent period configuration.

FIG. 13 is a diagram of an example scenario where there may be fully independent silent periods. This scenario may occur in the situation where either the sensing radio is far enough that the interference caused by the transmitters do not impede wireless microphone or DTV detection, or in the situation where all channels are of type "Free". In this case, the SPME may maintain a separate schedule on each of the four channels. Requests by the MAC QoS entity to increase or decrease the delay on any particular channel or channels may affect the schedule only on that channel or channels and not on the other channel. In particular, the Channel 2 delay may be decreased from 1 ms to 0.5 ms.

The example illustrated in FIG. 13 assumes silent periods 1300 with duration of 1 ms with periodicity of 1000 ms, (the default scenario for channels of type "Free"). A similar scheduling may occur for different values of silent period duration and periodicity. Because of the use of independent silent periods, a primary channel switch may occur during the silent period for Channel 1 so that Channel 2 may be temporarily used as the primary channel during this time. As shown, when independent silent periods are used, the skew of the silent periods over the different channels may be such that the silent periods are evenly distributed over the 1000 ms period.

Figure 14:
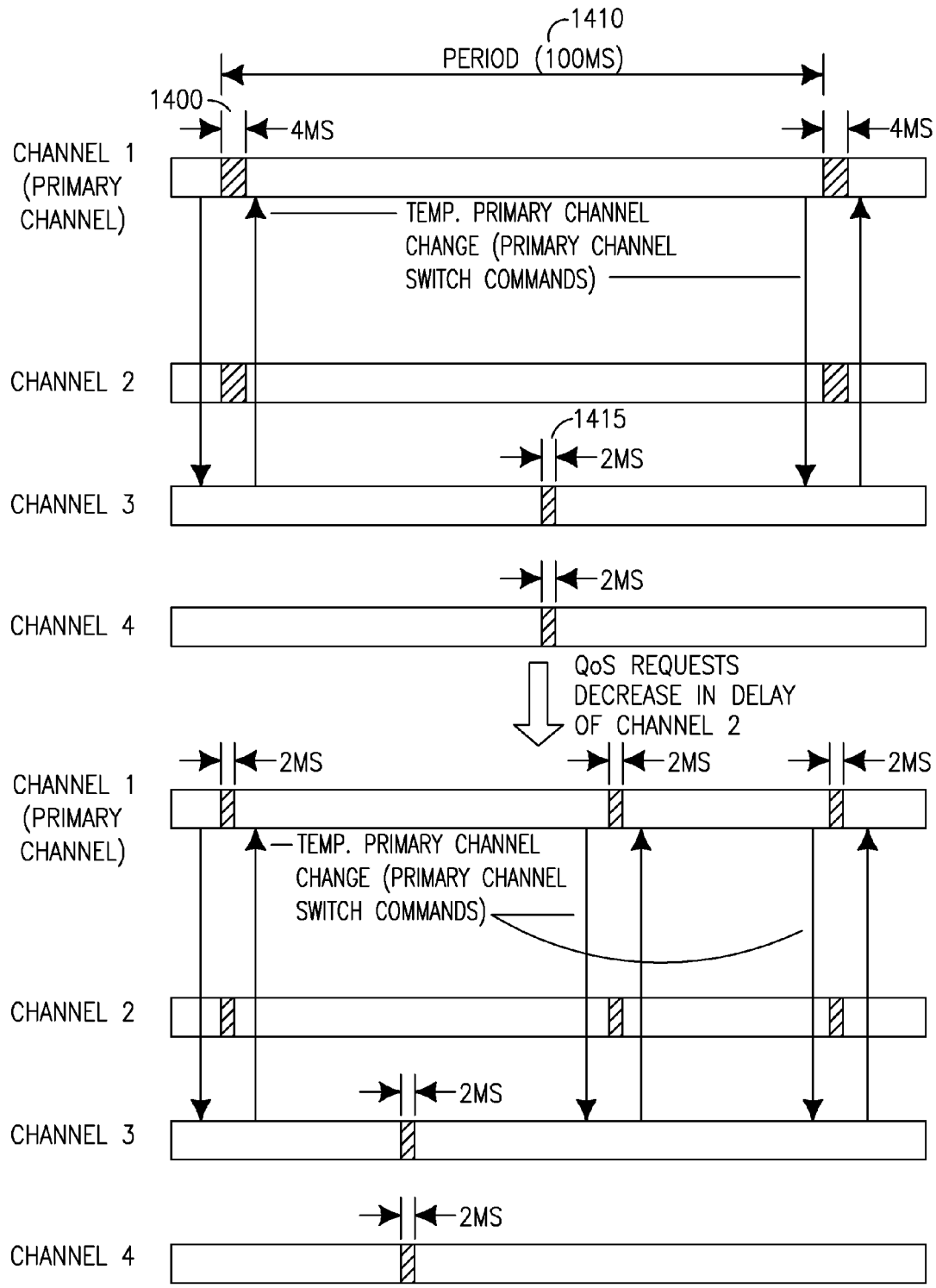
FIG. 14 is a diagram of another example silent period configuration.

FIG. 14 is a diagram of an example scenario where there may be two independent channel sets. This scenario may occur in the situation where the "far sensor" assumption does not apply. Two independent channel sets may be required if two channels are allocated in the low-band and two channels are allocated in the high-band. In addition, at least one of the two channels in the low-band range may require sensing of wireless microphone or DTV, and similarly with at least one of the channels in the high-band range. Although one or more channels may be of type "Free" and therefore require only quality measurements for that channel, that channel may inherit the silent period duration and periodicity of the channel requiring sensing of wireless microphone or DTV, as described in the Rule on Channel Dependence. The specific example in the scenario in FIG. 14 shows two dependent channels matched to the Channel Type 1 duty cycle requirements, (i.e., Channels 1 and 2 having a silent period 1400 of 4 ms. over a period 1410 of 100 ms), and two dependent channels matched on the Channel Type 2 duty cycle requirements, (i.e., Channels 3 and 4 having a silent period 1415 of 2 ms). In this example, a temporary primary channel change may occur during the shaded region in the Channel Type 1 channels to the Channel Type 2 channels.

The scenario of two independent channel sets may also occur when one channel is allocated in the high band and three channels are allocated in the low-band, or vice-versa. For this case to fall in this scenario, at least one of the channels in the band where the three channels have been allocated may require sensing of wireless microphone or DTV, thus requiring these three channels to be independent. The behavior of the SPME may be similar to the example shown in FIG. 15, where three of the four channels may exhibit channel synchronous silent periods.

Figure 15:
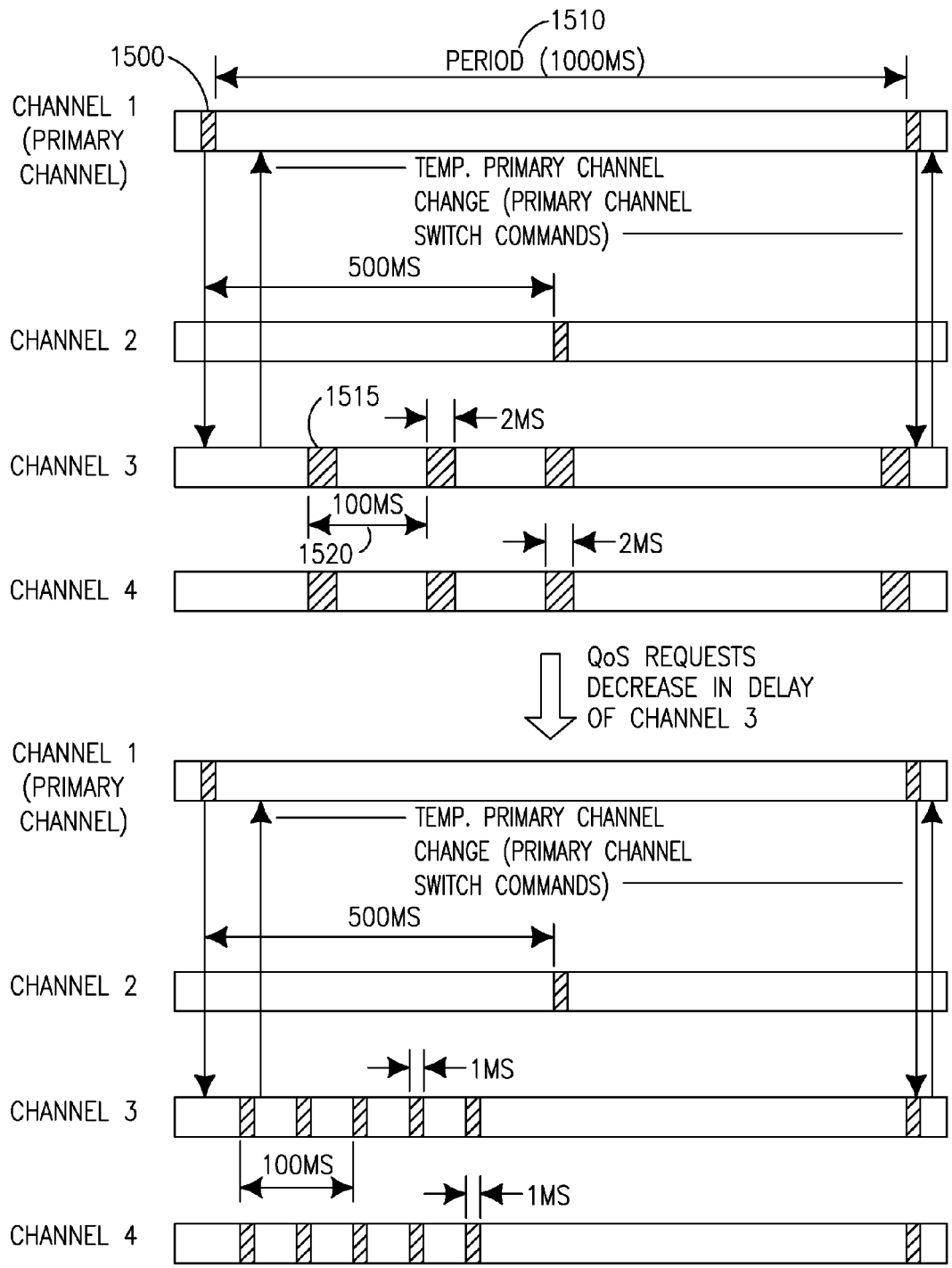
FIG. 15 is a diagram of another example silent period configuration.

FIG. 15 is a diagram of an example scenario where there may be three independent channel sets. This scenario may require the "far sensor" assumption to not apply. This scenario may occur when two channels of Channel Type 4 are allocated in the same radio band, (i.e., channels 1 and 2 having a silent period 1500 and period 1510), while two other channels (one of which is not type 4) are allocated in the other radio band, (i.e., channels 3 and 4 having a silent period 1515 and period 1520). The two channels in the first band may form two channels that have independent silent periods. The two channels in the second band may form a dependent channel set, but may be independent from each of the channels in the first set.

Figure 16:
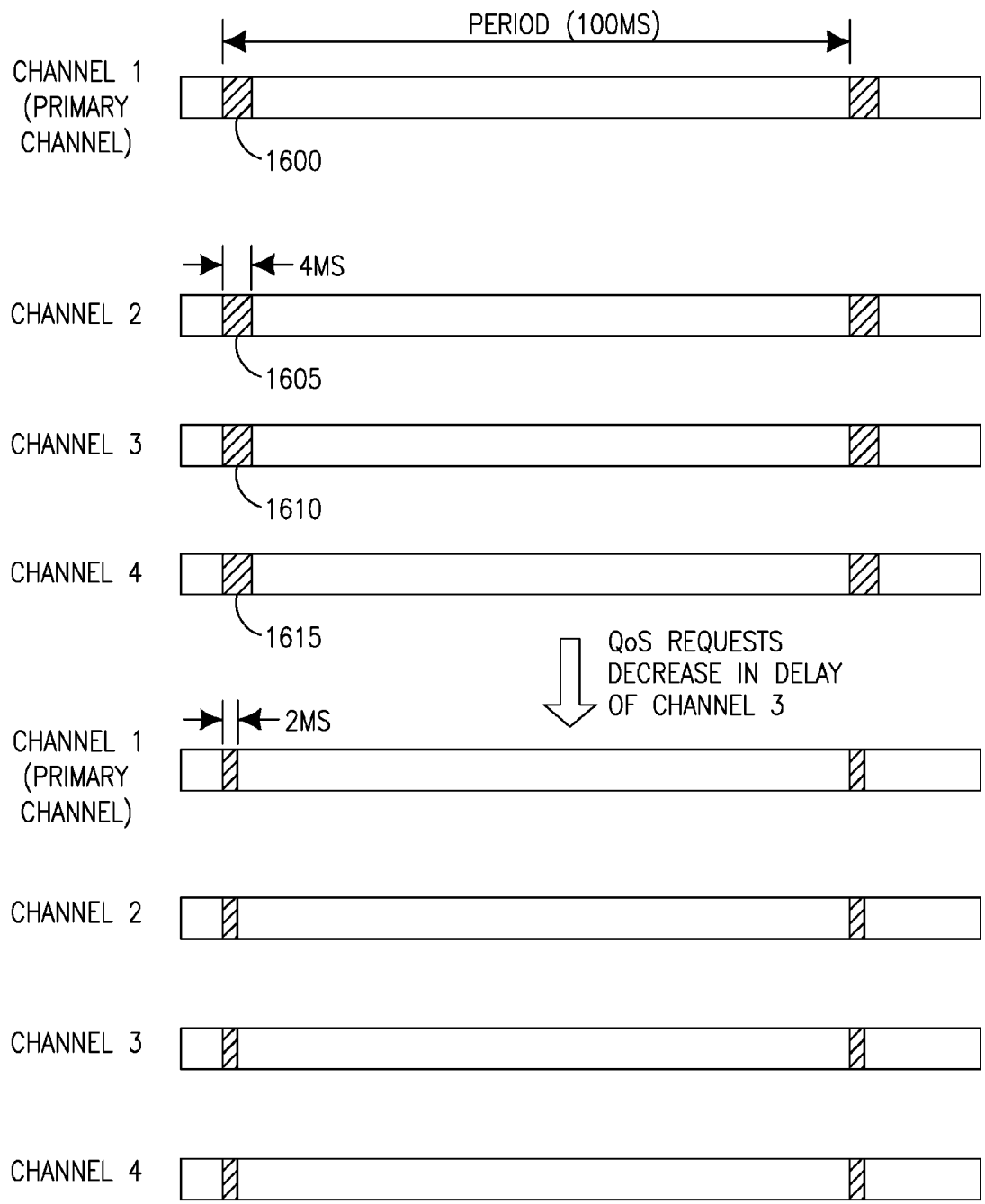
FIG. 16 is a diagram of another example silent period configuration.

FIG. 16 is a diagram of an example scenario where there may be fully channel synchronous silent periods 1600. 1605, 1610 and 1615. In this scenario, all four channels may require dependent silent periods. This scenario may occur in the case where the "far sensor" assumption does not apply, and all four channels may be allocated in the same radio band. In this case, the silent period duration and periodicity for all four channels may match the duration and periodicity of the channel with the highest silent period requirements. In this scenario, a switch of the primary channel may not be possible. As a result, the entire aggregated channel may be busy for the duration of the silent period time.

The MAC QoS entity may be designed for optimizing silent periods. The requirements for adapting the silent periods for PU detection and SU detection, (or channel quality), may be different. SU detection may occur for channels that are free of PUs, and it may provide information on the quality of the channel where sensing is being performed. For PU detection, for practical purposes, the silent period duty cycle may be fixed. However, there may not be such a restriction for SU detection.

Described herein are example signal exchanges between a MAC QoS entity and a SPME for PU detection. To support dynamic silent period configuration, the S4 interface may be used as described hereinabove. There may be a number of approaches that may be used, and each approach may differ in the way that it uses the DELAY_CHANGE_REQ message.

A first approach may use a one-time specification. In this approach, the QoS module may determine the desired value for Td for achieving desired delay and throughput performance, and send the desired value in the DELAY_CHANGE_REQ, (one-time value), message. However, the relationship between Td and the delay and throughput performance may be affected by the protocol behavior and the traffic condition, and may be difficult to be accurately captured. Therefore, this first approach may be more difficult to implement. However, it may allow for a more accurate specification of the required silent period schedule and reduce the messaging overhead.

Figure 17:
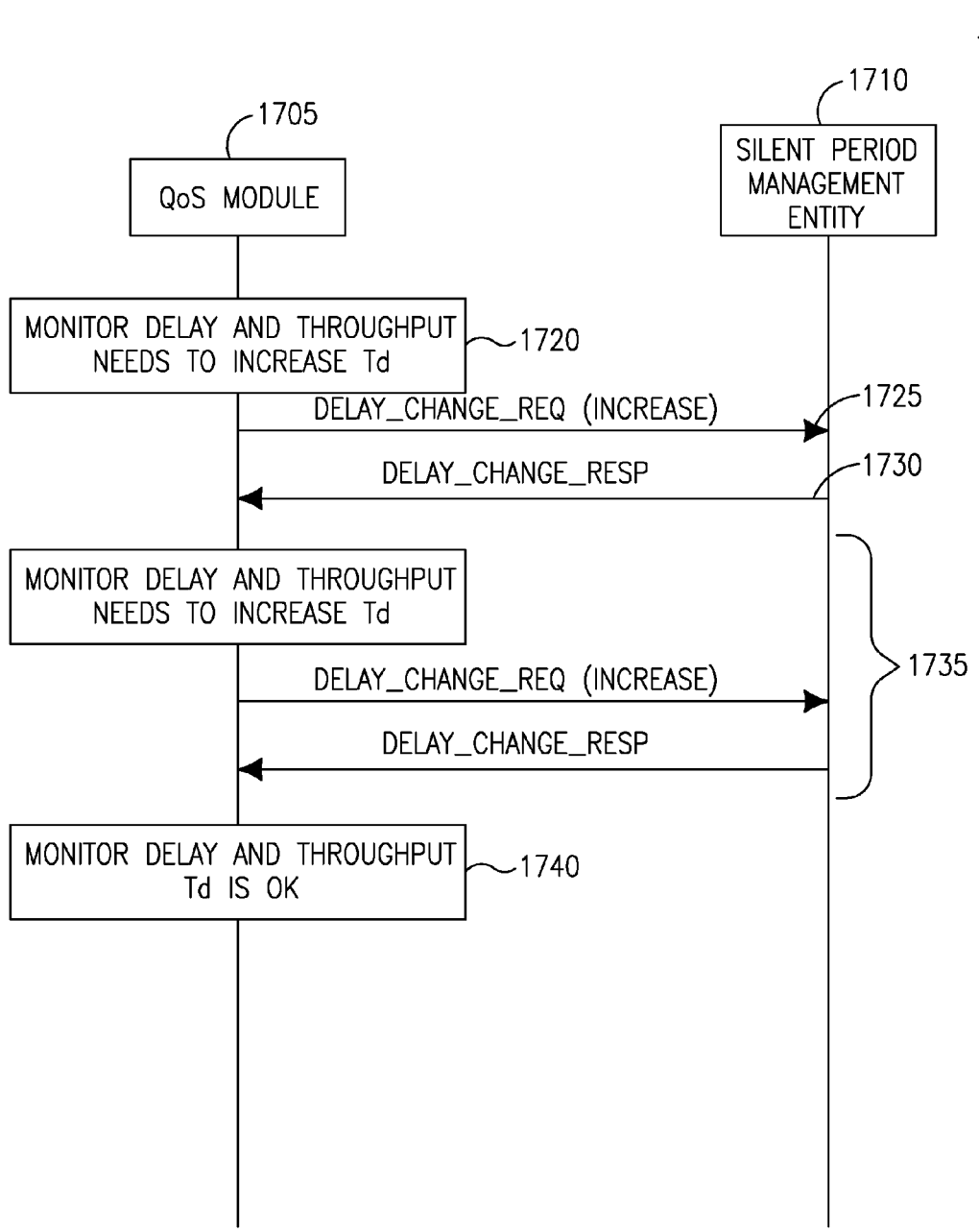
FIG. 17 is a flow diagram for an example probing approach for primary user (PU) detection.

FIG. 17 is an example call flow 1700 of a signal exchange between a MAC QoS entity 1705 and a SPME 1710 for PU detection. The call flow may be applicable to a second approach where probing may be used with a change in an absolute amount. The MAC QoS entity 1705 may determine the desired value for Td for achieving desired delay and throughput performance (1720) and may then send a DELAY_CHANGE_REQ, (i.e., an increase or decrease), to the SPME 1710 (1725). The SPME 1710 may increase/decrease the silent duration by a certain amount of time, for example, n ms. For example, Td←Td−n or Td←Td+n. The SPME 1710 may send a DELAY_CHANGE_RESP message to confirm whether the requested increase or decrease has occurred (1730). The MAC QoS entity 1705 and SPME 1710 may repeat these messages (1735) until the desired delay and throughput values are obtained (1740).

The example call 1700 may also be applicable for a third approach that may use probing and a change in a relative amount. The MAC QoS entity 1705 may determine the desired value for Td for achieving desired delay and throughput performance (1720) and may then send a DELAY_CHANGE_REQ, (i.e., an increase or decrease), to the SPME 1710 (1725). The SPME 1710 may decrease/increase the silent duration by a certain fraction, for example, Td←Td(1−v) or Td←Td(1+v), where v may be the fraction of decrease/increase. The SPME 1710 may send a DELAY_CHANGE_RESP message to confirm whether the requested increase or decrease has occurred (1730). The MAC QoS entity 1705 and SPME 1710 may repeat these messages (1735) until the desired delay and throughput values are obtained (1740). When Td is changed, the number of Td's within a Tp may be changed to keep the sensing duty cycle the same.

Described herein are example signal exchanges between a MAC QoS entity and a SPME for SU detection. In contrast to the PU detection example, there may be no restriction on the silent periods for SU detection. There may be a number of approaches, and each approach may differ in the way that it uses the SILENT_AMOUNT_CHANGE_REQ message.

A first approach may use a one-time specification. In this approach, the MAC QoS entity may determine the desired value for the silent period for achieving the desired delay and throughput performance, and may send the desired value in the SILENT_AMOUNT_CHANGE_REQ (value) message. The greater the silent period, (denoted as Ts), the better the sensing performance, and on the other hand, the less the time for the traffic delivery. This may degrade the network performance. However, if the silent period is too short, the sensing performance may be poor, making the DSM system unable to find good channels to operate on and hence may result in poor network performance. Accordingly, a proper value may be selected for the silent period. However, similar to the case of PU detection, there may be a problem with the first approach, because the relationship between silent period and the network performance may be affected by the protocol behavior and the traffic condition, and it may be difficult to be accurately captured.

Figure 18:
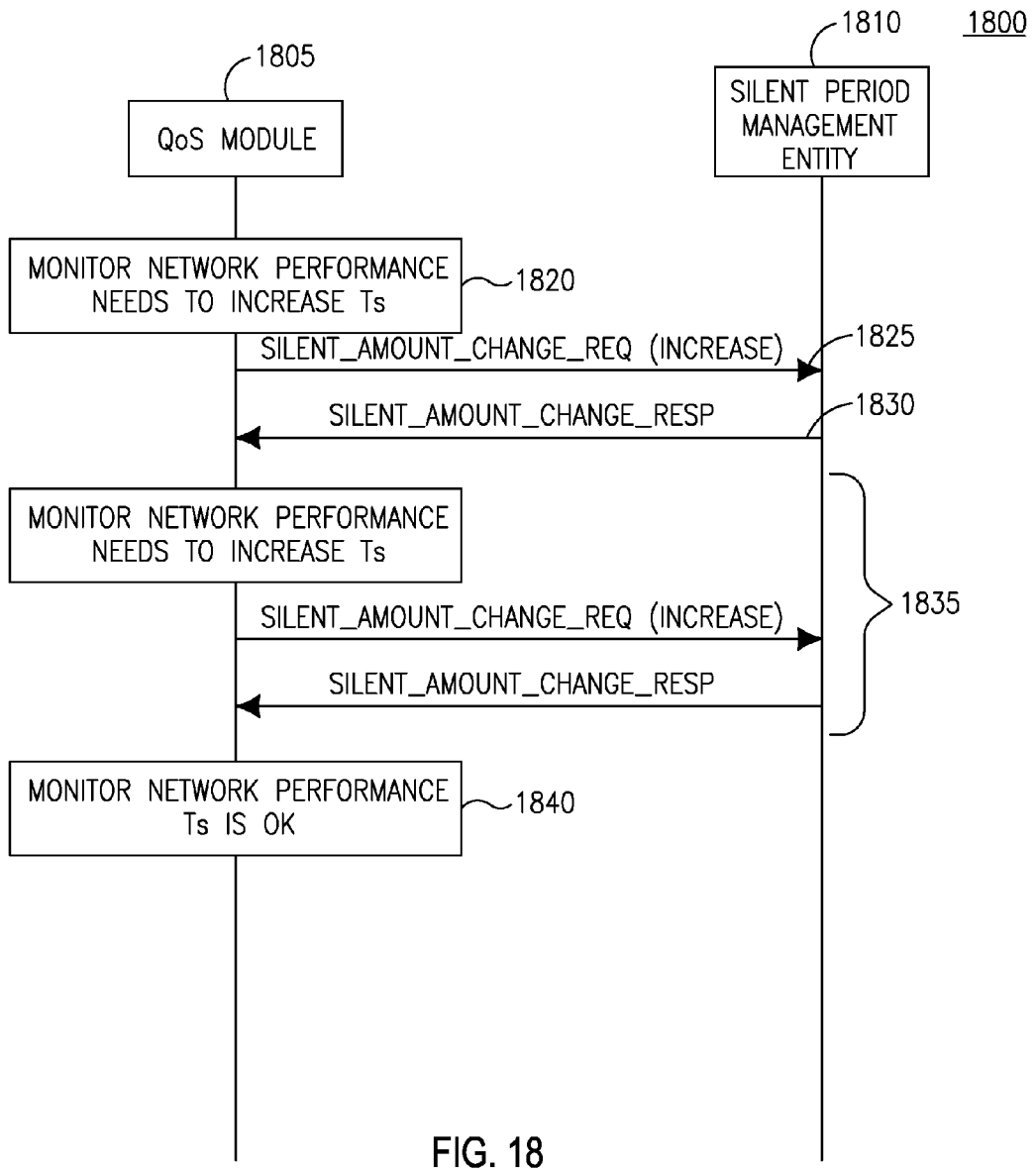
FIG. 18 is a flow diagram for an example probing approach for secondary user (SU) detection.

FIG. 18 is an example call flow 1800 of a signal exchange between a MAC QoS entity 1805 and a SPME 1810 for SU detection. The call flow may be applicable to a second approach where probing may be used with a change in an absolute amount. The MAC QoS module 1805 may monitor network performance and determine the desired value for Ts for achieving desired delay and throughput performance (1820) and may send a SILENT_AMOUNT_CHANGE_REQ, (i.e., an increase or decrease), to the SPME 1810 (1825). The SPME 1810 may increase/decrease the silent period by a certain amount of time, for example, n ms. For example, Ts←Ts−n or Ts←Ts+n. The SPME 1810 may send a SILENT_AMOUNT_CHANGE_RESP message to confirm whether the requested increase or decrease has occurred (1830). The MAC QoS entity 1805 and SPME 1810 may repeat these messages (1835) until the desired delay and throughput values are obtained (1840).

The example call 1800 may also be applicable for a third approach that may use probing and a change in a relative amount. The MAC QoS module 1805 may monitor network performance and determine the desired value for Ts for achieving desired delay and throughput performance (1820) and may send a SILENT_AMOUNT_CHANGE_REQ, (i.e., an increase or decrease), to the SPME 1810 (1825). The SPME 1810 may increase/decrease the silent period by a certain fraction, for example, Ts←Ts(1+v)/Ts←Ts(1−v), where v may be the fraction of the increase/decrease. The SPME 1810 may send a SILENT_AMOUNT_CHANGE_RESP message to confirm whether the requested increase or decrease has occurred (1830). The MAC QoS entity 1805 and SPME 1810 may repeat these messages (1835) until the desired delay and throughput values are obtained (1840).

The MLME may be modified to support silent period coordination. Periodic silent periods may be coordinated across the DSM system by transmitting the silent period information within the beacon. The IEEE 802.11 beacon may contain a 'quiet element' field that defines an interval of time during which no transmission should occur in the current channel. This 'quiet element' may be added to the aggregated beacon and used to coordinate the silent periods. The quiet element may be modified to account for the factors described herein below.

To support the silent period scheduling, the aggregated beacon may send quiet elements on each of the channels to be aggregated. These quiet elements may represent the silent period duration and timing associated with all channels. This may ensure the maximum robustness for the system, so that if the beacon on one of the four channels is missed, the station may still be aware of the silent period for all channels based on the silent period information received on other channels.

Figure 19:
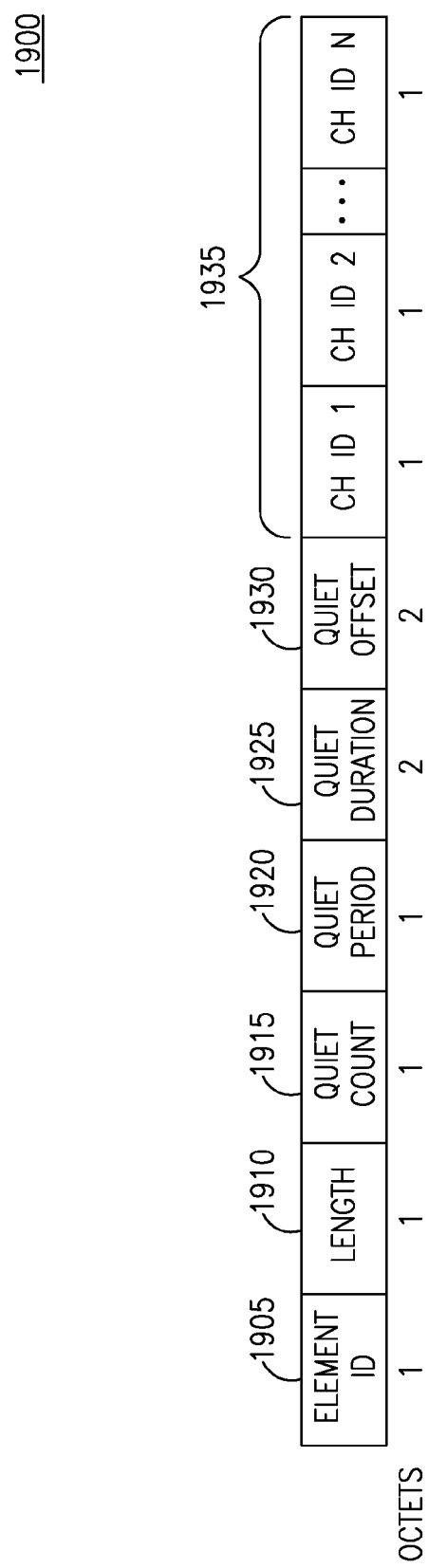
FIG. 19 is a diagram of an example message format.

FIG. 19 is a diagram of an example quiet element format 1900 for the aggregated channels. The quiet element may have an element ID field 1905 of 1 octet, a Length field 1910 of 1 octet, a Quiet Count field 1915 of 1 octet, a Quiet Period field 1920 of 1 octet, a Quiet Duration 1925 field of 2 octets, a Quiet offset field 1930 of 2 octets, a Ch ID 1 field 1935 of 1 octet . . . a CH ID N field of 1 octet.

A single quiet element 1900 may describe the silent period for more than one channel for the case of channel-synchronous silent periods. In addition, a single channel may require multiple quiet elements to describe the silent periods on it, as shown in the scheduling examples. For a channel with no silent periods defined for it, the quiet duration field 1925 may be set to 0, or a quiet element 1900 may not be sent on that channel. This may allow sending of a quiet element 1900 with the Quiet Count field 1930 of 0, which may not be allowed in IEEE 802.11, but may be necessary to ensure stations that first hear the beacon will not transmit if the current beacon interval contains a silent period.

In addition to this, the Quiet Offset field 1930 may be redefined to support silent period intervals, (time between silent periods), of less than 100 ms. A Quiet Offset field 1930 having a value of 0 may represent a silent period that occurs at most once every beacon period, (assuming a Quiet Period field 1920 having a value of 1). Therefore, setting the Quiet Offset field 1930 to a value of 0 may result in silent period intervals that are multiples of the beacon period, assuming 100 ms. When the Quiet Offset field 1930 has a value set to a non-zero value, this value may represent the length of time, (in time units (TUs)), between silent periods that may occur within the same beacon interval, as opposed to the offset from the start of the target beacon transmission time (TBTT) as in IEEE 802.11.

The quiet element 1900 may be modified to keep backward compatibility with the IEEE 802.11 quiet element. The length field 1910 may be used to indicate the number of channel identities (ID)s 1935 that may be attached to the end of the quiet element 1900. Each channel ID 1935 may represent one of the channels that may have the periodic silent period described by this quiet element 1900. In addition, the changes described herein below may be made to the interpretation of each field. The Quiet Count field 1915 may take on a value of zero to indicate that the silent period or periods may be within the current beacon interval. When at least one silent period may occur within each beacon interval, the Quiet Count field 1915 may have a value of zero. The Quiet Period field 1920 may continue to indicate the value of the number of beacon intervals between quiet periods. In addition, when the Quiet Period field 1920 may have a value of 0, the periodicity for this silent period may be smaller than one beacon interval, for example, there may be more than one silent period in the beacon interval. When the Quiet Period field 1920 may have a value of 1 or larger, the Quiet Offset field 1930 may have the same interpretation as in IEEE 802.11. When the Quiet Period field 1920 may have a value of 0, the Quiet Offset field 1930 may represent the interval between the silent periods occurring within the beacon interval.

Due to the advanced notice provided by the Quiet Count field 1915, the MAC entity buffering scheme may prepare itself for the occurrence of a scheduled silent period. Since a given silent period schedule sent on a beacon may supersede all previously scheduled silent periods, silent period configuration may be changed at each beacon interval.

An alternative format to the quiet element 1900 may maintain the same fields as in IEEE 802.11 and split each field (quiet count, quiet period, and the like) into four subfields, where each subfield may represent one of the four channels.

An additional rule that may be followed by stations to ensure robust sensing during the silent time may be for stations to abstain from transmitting over any beacon interval when the station did not receive the beacon on any of the four channels. Since the silent period may be defined relative to the beacon, (either immediately following the beacon, or a specified number of TUs following a beacon), exact knowledge of the silent period time(s) in a beacon interval may require correct reception of the beacon for that interval. Since the silent period information for all channels may be transmitted on the aggregated beacon of each channel, the probability of a station having to abstain from transmission during a beacon interval may be low and the loss of efficiency may be low.

For the case where the number of aggregated channels is low and a high probability of missing a beacon is expected, the station may be allowed to transmit in the beacon interval where the beacon is missed and then rely on the silent period information from the previously received beacons. A safe padding may be added to the expected silent period time to account for the potential of the beacon having been delayed due to retransmissions and CSMA contention delay. This safe padding may be reduced to a reasonable amount by having the beacon referenced to the end of the TBTT.

Figure 20A:
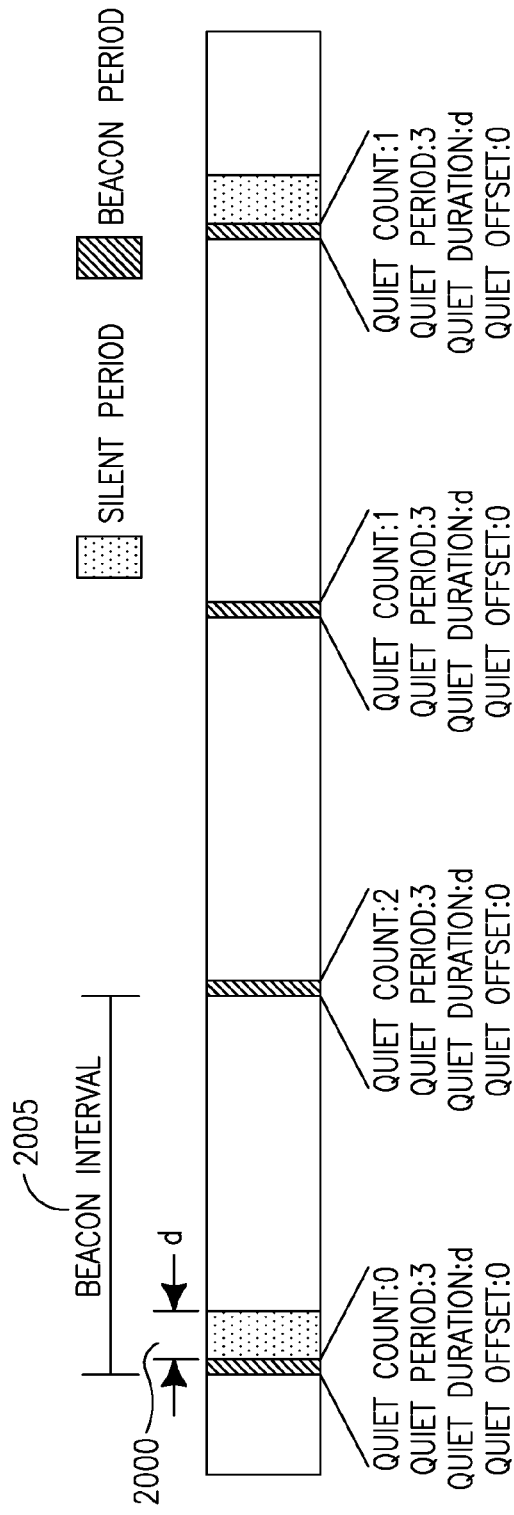
Figure 20B:
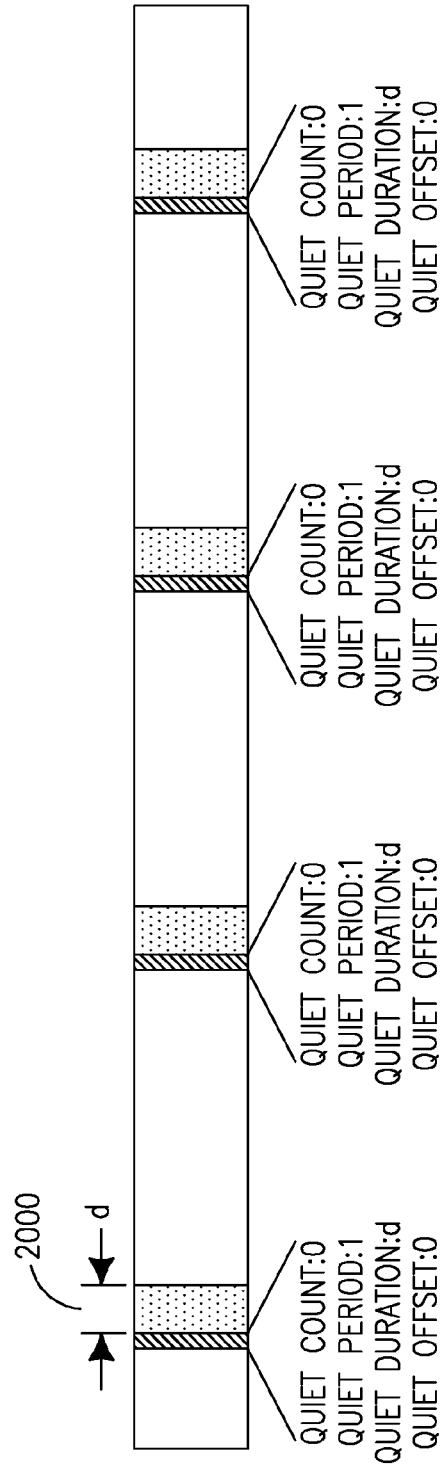

FIGS. 20A, 20B and 20C are examples of silent period intervals 2000 relative to beacon intervals 2005. The examples use the Quiet Offset field to configure a silent period having different ranges of silent intervals relative to the beacon interval. In FIG. 20A, the silent period interval is greater than the beacon interval. In FIG. 20B, the silent period interval may be equal to the beacon interval. In FIG. 20C, the silent period interval may be less than the beacon interval.

To simplify the insertion of the silent period within the regular IEEE 802.11 operation, the following rules may be used by the MLME. These rules may be independent of the channel in the aggregation scheme.

The timing of a first silent period 2100 of a beacon interval 2105 with respect to broadcast and poll messages is shown in FIG. 21. If a silent period 2100 is scheduled immediately following the beacon 2110, it may occur between the beacon transmission and the traffic indication map (TIM) or delivery traffic indication message (DTIM) interval 2115 where the AP may transmit buffered broadcast/multicast frames, or the station may poll for buffered unicast frames. This means that stations may wakeup to send the poll message in response to the TIM in the beacon after the end of the scheduled silent period. This rule may ensure that the silent period occurs at a specific period in time, (due to the lack of any contention for frames or acknowledgements (ACKs)), and that the TIM/DTIM interval may remain at a fixed time instant, (since the silent period is a fixed number of TUs). Since all stations may be quiet during the beacon, the system may know that the silent period may start once the beacon has been transmitted by the AP. This knowledge may be used to ensure synchronization with the sensing processor/toolbox.

Figure 22:
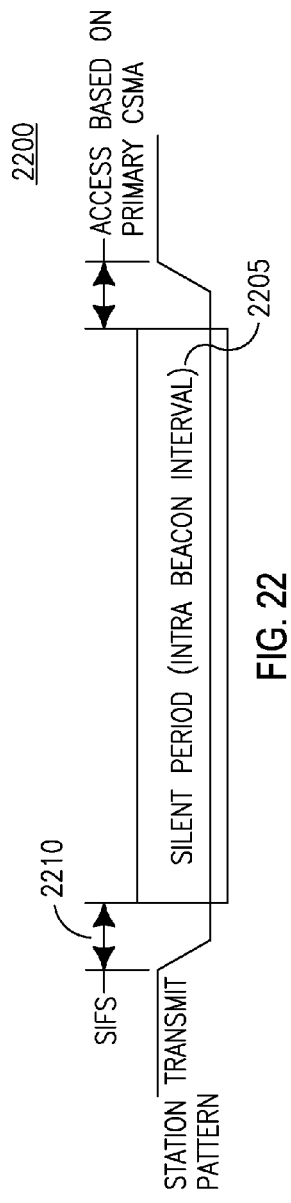
FIG. 22 is a diagram of an example station transmission pattern.

FIG. 22 is a diagram of an example station transmission pattern 2200 at the arrival of an intra-beacon silent period 2205. For silent periods that occur between TBTTs, for example, when the Quiet Offset field is non-zero, an AP or a station may ensure that its frame transmission may complete at least a short interframe space (SIFS) 2210 before the scheduled start of the silent period. This may ensure that the start of the silent period coincides with a situation where no transmission is currently on the air. The start of a sensing operation may be synchronized with the scheduled start of a silent period.

Figure 23:
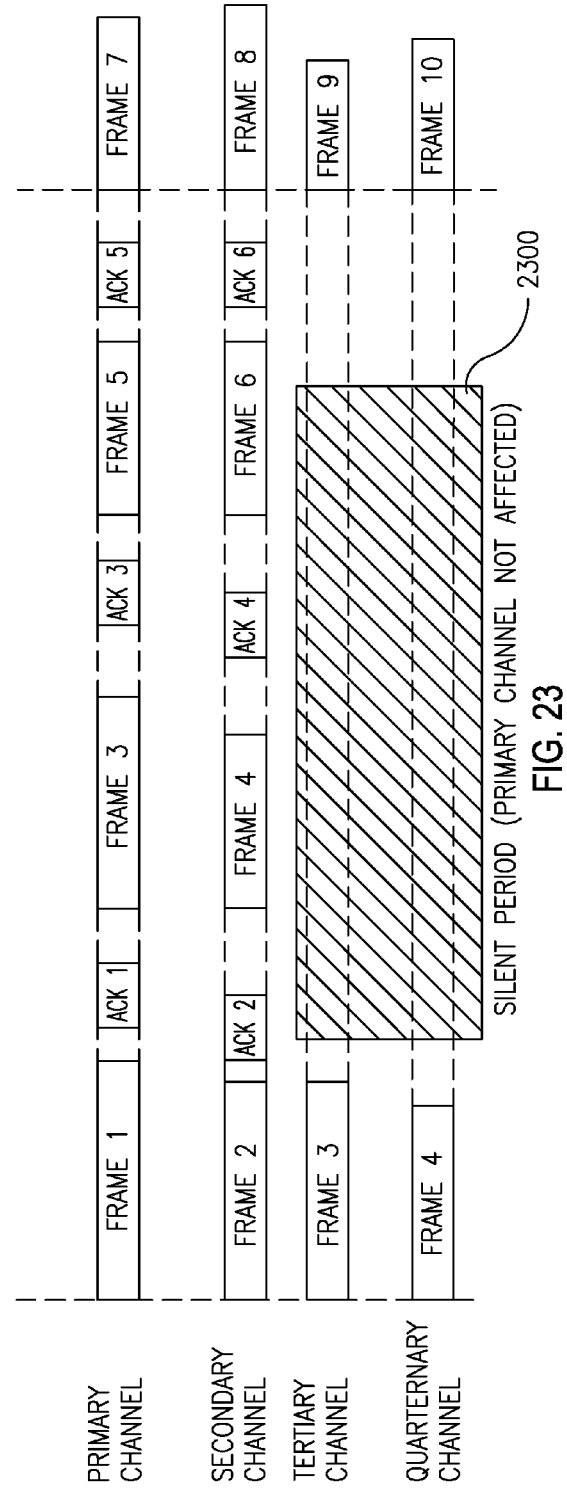
FIG. 23 is a diagram of an example channel independent silent period.

FIG. 23 is a diagram of an example channel independent silent period that may affect non-primary channels. The MLME may allow silent periods 2300 on a subset of channels while maintaining the primary channel operation on the remaining channels. In order to do so, unacknowledged frames due to the silent period may be retransmitted on the available channels.

Figure 24:
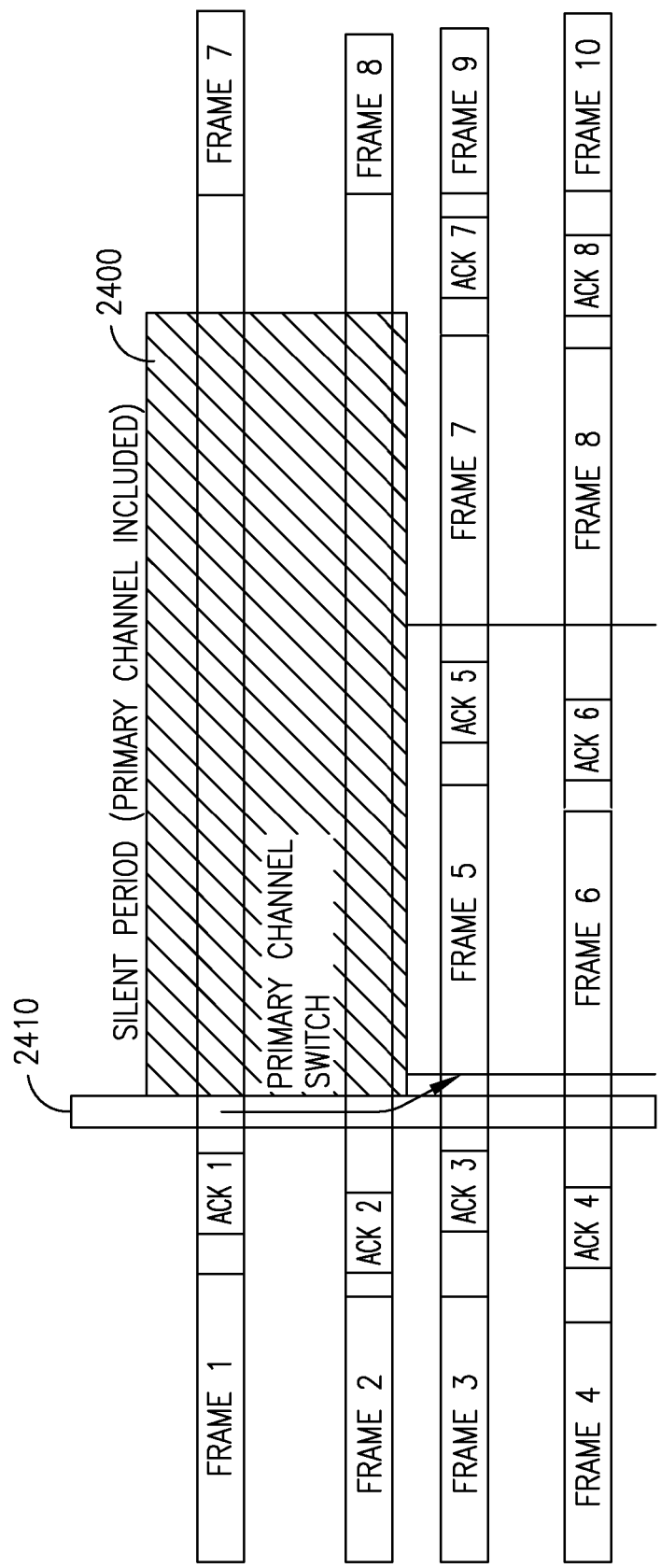
FIG. 24 is a diagram of another example channel independent silent period.

FIG. 24 is a diagram of an example channel independent silent period 2400 that may affect a primary channel. In this example, a primary channel switch mechanism 2410 may be required. This mechanism may be implemented by a switch message 2410 sent along with the beacon, as shown in FIG. 24. Other methods of performing the primary channel switch, such as a scheduled switch configured at each known switch time using a separate management message, may also be possible.

Asynchronous Silent Periods may be coordinated with stations using a special control channel message containing one or more quiet elements. The control channel message may transmit the quiet elements associated with each channel on all channels, for example, the message may be repeated on each of the channels. In the case of an asynchronous silent period, only the duration field may be used. The other elements may be "don't care" values. In addition to sending the asynchronous silent period message on all channels, the following procedure may be used to further improve robustness of the asynchronous silent period to the possibility of stations not receiving the control message.

Figure 25:
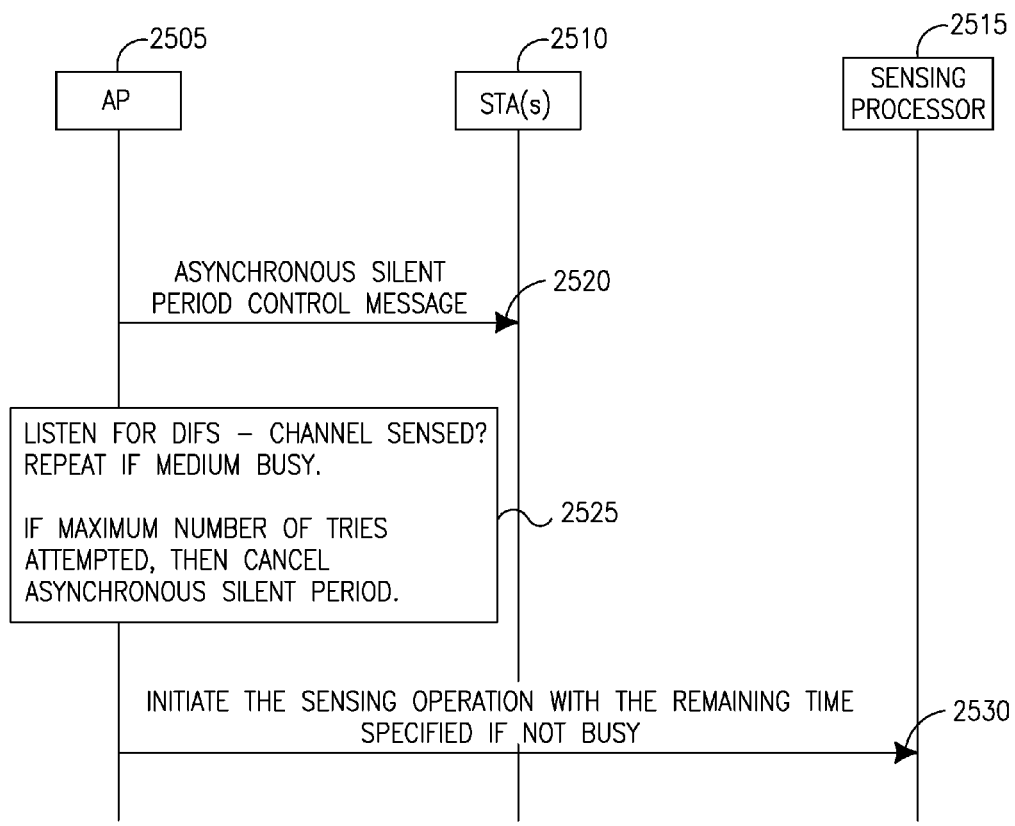
FIG. 25 is an example call flow for asynchronous silent period.

FIG. 25 shows an example call flow 2500 for asynchronous silent periods between an AP 2505, STAs 2510, and a sensing processor 2515. The AP may 2505 may broadcast the asynchronous silent period control message to all STAs 2510 stations (2520). Following transmission of the message, the AP 2505 may listen to the medium for distributed coordination function (DCF) interframe space (DIFS) (2525). If the medium is quiet for that time, the AP 2505 may trigger the sensing processor 2515 to initiate the sensing operation with the remaining time specified (2530). If a channel access was sensed on the medium by a device belonging to the DSM system, the AP may repeat the first two steps (2535) prior to sending the silent period start indication to the sensing processor 2515. The first two steps may be repeated multiple times up to a predetermined maximum number of times. If the medium is still busy after that point, the AP 2505 may cancel scheduling of the asynchronous silent period and rely on periodic silent periods to satisfy the request from the sensing processor 2515.

Although features and elements are described above in particular combinations, one of ordinary skill in the art may appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A base station, comprising:
 a processor configured to determine a length and schedule of a silent period for each channel of a plurality of aggregated channels based on system information, wherein each channel of the plurality of aggregated channels is using unlicensed spectrum, and wherein a first silent period for a first channel of the plurality of aggregated channels is not scheduled to occur when a second silent period for a second channel of the plurality of aggregated channels is scheduled to occur;

the processor further configured to select the first channel as a new primary channel when the second silent period occurs, wherein the new primary channel transmits data and acts as a common control channel for the plurality of aggregated channels during the second silent period, and wherein each of the remaining channels of the plurality of aggregated channels performs its respective silent period during the second silent period; and a transmitter configured to transmit the length and schedule of the silent period for each channel to at least one wireless transmit/receive unit (WTRU).

2. The base station of claim 1, wherein respective silent periods for each channel of the plurality of aggregated channels are non-synchronized.

3. The base station of claim 1, wherein the unlicensed spectrum is television white space (TVWS) spectrum.

4. The base station of claim 1, wherein some of the plurality of aggregated channels are grouped into at least one set, and wherein respective silent periods for channels in the at least one set synchronized are independent from other channels.

5. The base station of claim 1, wherein the processor is further configured to assign a silent period duration and periodicity corresponding to each silent period.

6. The base station of claim 1, wherein the current primary channel may be changed in a round-robin fashion.

7. The base station of claim 1, wherein the transmitter is further configured to transmit a notification to a sensing processor to start a sensing operation.

8. The base station of claim 1, wherein the processor is further configured to reconfigure the length and the schedule of the silent period for each channel based on at least one of system delay, system throughput, quality of service, or channel management events.

9. The base station of claim 1, wherein the processor is further configured to modify a silent period duty cycle based on at least one of an interference type, an expected primary user usage, an expected secondary user usage, or a quality of service.

10. The base station of claim 1, wherein the processor is further configured to select between channel independent and channel synchronized silent periods based on the system information, and wherein the system information is at least interference information.

11. The base station of claim 1, further comprising:
a medium access (MAC) layer management entity (MLME) configured to provide an asynchronous silent period control message to initiate a non-periodic silent period.

12. A method for silent period management, comprising:
determining a length and schedule of a silent period for each channel of a plurality of aggregated channels based on system information, wherein each channel of the plurality of aggregated channels is using unlicensed spectrum, and wherein a first silent period for a first channel of the plurality of aggregated channels is not scheduled to occur when a second silent period for a second channel of the plurality of aggregated channels is scheduled to occur;

selecting the first channel as a new primary channel when the second silent period occurs, wherein the new primary channel transmits data and acts as a common control channel for the plurality of aggregated channels during the second silent period, and wherein each of the remaining channels of the plurality of aggregated channels performs its respective silent period during the second silent period; and inserting the length and schedule of the silent period for the first channel into a beacon to coordinate silent period schedules for the plurality of aggregated channels.

13. The method of claim 12, further comprising:
transmitting the beacon on at least one channel, wherein the beacon comprises a quiet element based on the length and schedule of the first silent period to coordinate silent period schedules for the plurality of aggregated channels.

14. The method of claim 12, further comprising:
determining a start time for the second silent period;
disabling channels affected by the second silent period; and
notifying a sensing processor that the second silent period has started.

15. The method of claim 12, further comprising:
modifying a silent period duty cycle in response to a request from a medium access control (MAC) quality of service (QoS) entity.

16. The method of claim 12, wherein at least one of the first silent period or the second silent period is based on a channel duty cycle, and wherein the at least one of the first silent period or the second silent period silences at least one low band channel, at least one high band channel, or at least one band wide channel.

17. The method of claim 13, wherein the quiet element comprises at least one of a length field to indicate the length of the first silent period, a quiet count field to indicate that the first silent period will occur in a current beacon interval, or a quiet offset field to indicate an interval between silent periods occurring within a single beacon interval.

18. A method for silent period management, comprising:
determining a length and schedule of a silent period for each channel of a plurality of aggregated channels based on system information, wherein each channel of the plurality of aggregated channels is using unlicensed spectrum, and wherein a first silent period for a first channel of the plurality of aggregated channels is not scheduled to occur when a second silent period for a second channel of the plurality of aggregated channels is scheduled to occur;

selecting the first channel as a primary channel when the second silent period occurs, wherein the primary channel transmits data and acts as a common control channel for the plurality of aggregated channels during the second silent period, and wherein each of the remaining channels of the plurality of aggregated channels performs its respective silent period during the second silent period; and transmitting the length and schedule of the silent period for each channel to at least one wireless transmit/receive unit (WTRU).

19. The method of claim 18, wherein respective silent periods for each of the plurality of aggregated channels are non-synchronized.

20. The method of claim 19, wherein the primary channel may be changed in a round-robin fashion.

* * * * *